US011936819B2

(12) United States Patent
Tsukamoto

(10) Patent No.: US 11,936,819 B2
(45) Date of Patent: Mar. 19, 2024

(54) IMAGE INSPECTION APPARATUS, SYSTEM, METHOD, AND PROGRAM PRODUCT THAT COMBINES A TRIAL PRINT AND AN AREA DESIGNATED IN A RECORDING MEDIUM

(71) Applicant: Konica Minolta, Inc., Tokyo (JP)

(72) Inventor: Yasumasa Tsukamoto, Hino (JP)

(73) Assignee: Konica Minolta, Inc., Tokyo (JP)

( * ) Notice: Subject to any disclaimer, the term of this patent is extended or adjusted under 35 U.S.C. 154(b) by 379 days.

(21) Appl. No.: 17/485,720

(22) Filed: Sep. 27, 2021

(65) Prior Publication Data

US 2022/0116504 A1 Apr. 14, 2022

(30) Foreign Application Priority Data

Oct. 13, 2020 (JP) .................. 2020-172709

(51) Int. Cl.
*H04N 1/00* (2006.01)
(52) U.S. Cl.
CPC ..... *H04N 1/00031* (2013.01); *H04N 1/00039* (2013.01); *H04N 1/00074* (2013.01); *H04N 1/00087* (2013.01); *H04N 1/0009* (2013.01); *H04N 1/00411* (2013.01); *H04N 1/0044* (2013.01)
(58) Field of Classification Search
CPC . H04N 1/00002–0009; H04N 1/00408–00472
See application file for complete search history.

(56) References Cited

U.S. PATENT DOCUMENTS

| | | | | |
|---|---|---|---|---|
| 10,788,777 | B2* | 9/2020 | Ikuta | G06F 3/1208 |
| 2020/0250805 | A1* | 8/2020 | Tsukamoto | G06T 7/0002 |
| 2020/0288030 | A1* | 9/2020 | Tsukamoto | H04N 1/00803 |
| 2023/0252813 | A1* | 8/2023 | Iwaki | G06V 30/1456 |
| | | | | 382/209 |
| 2023/0273755 | A1* | 8/2023 | Muraishi | H04N 1/0044 |
| | | | | 358/1.15 |
| 2023/0344943 | A1* | 10/2023 | Kawasaki | H04N 1/00037 |

FOREIGN PATENT DOCUMENTS

| | | |
|---|---|---|
| JP | 2020-53761 A | 4/2020 |
| JP | 2023035051 A * | 3/2023 |
| JP | 7359268 B2 * | 10/2023 |

\* cited by examiner

*Primary Examiner* — Scott A Rogers
(74) *Attorney, Agent, or Firm* — RANKIN, HILL & CLARK LLP

(57) ABSTRACT

An image inspection apparatus includes a designated area acquisition device that acquires information related to an area designated in a recording medium, wherein when trial printing is instructed, a read image of an image printed on the recording medium in the trial printing and an image of the area generated on the basis of the information related to the area acquired by the designated area acquisition device are combined.

15 Claims, 18 Drawing Sheets

IMAGE INSPECTION APPARATUS, SYSTEM, METHOD, AND PROGRAM PRODUCT THAT COMBINES A TRIAL PRINT AND AN AREA DESIGNATED IN A RECORDING MEDIUM

The entire disclosure of Japanese patent Application No. 2020-172709, filed on Oct. 13, 2020, is incorporated herein by reference in its entirety.

BACKGROUND

Technological Field

The present invention relates to an image inspection apparatus, an image inspection system, an image inspection method, and an image inspection program.

Description of the Related Art

Conventionally, an image forming apparatus (copying machine, printer, facsimile, multifunction machines including these devices, and the like) for forming a toner image on a sheet may fail to print an image intended by the user on a sheet due to various factors. For this reason, there is known an image inspection apparatus and an image inspection system that scan an image printed on a sheet, compare the scanned image with a normal image (reference image) registered in advance, and determine the quality of the image printed on the sheet.

Conventionally, there has also been known an image inspection system (see JP 2020-53761 A, for example) that uses, as a reference image, a read image in which various areas are specified, for an image (read image) obtained by reading a sheet printed in proof mode printing (trial printing). Examples of the various areas include an image inspection exclusion area (e.g., end of sheet and the like), a print management area (e.g., barcode, serial number formation area, and the like), and a variable area (e.g., destination address, name, and the like) in which different contents are printed for each print page. The image inspection system of JP 2020-53761 A is provided with a function of automatically excluding an exclusion area such as an end of a sheet during inspection, for example. The image inspection system of JP 2020-53761 A has a configuration that enables changing of the exclusion area by a user's input operation, and can set an area to be excluded from the image inspection target by a user setting.

As described above, conventionally, there has been proposed an image inspection system in which the user can specify (set) an area to be excluded from the image inspection target. However, the area to be excluded from the image inspection target is designated for a read image (hereinafter referred to as read image of proof mode printing) of a sheet printed in proof mode printing (trial printing). For this reason, when there are many (e.g., several tens of areas) areas (hereinafter referred to as designated areas) to be designated according to the content of the original, or when there is an immense number of print pages and the designated area is different for each page, for example, the area designation for the read image of proof mode printing becomes complicated. In addition, it takes more time to check the designated area as the number of print sheets increases. Accordingly, when a designated area is set and checked for a read image of proof mode printing, not only does the area designation become complicated, but also a prompt start of the final printing after execution of proof mode printing is hindered. Hence, there is also a problem that the overall productivity is deteriorated.

SUMMARY

The present invention has been made to solve the above problems, and an object of the present invention is to provide an image inspection apparatus, an image inspection system, an image inspection method, and an image inspection program that can facilitate setting and checking of a designated area and curb deterioration in productivity during image inspection.

To achieve the abovementioned object, according to an aspect of the present invention, an image inspection apparatus reflecting one aspect of the present invention comprises a designated area acquisition device that acquires information related to an area designated in a recording medium, wherein when trial printing is instructed, a read image of an image printed on the recording medium in the trial printing and an image of the area generated on the basis of the information related to the area acquired by the designated area acquisition device are combined.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
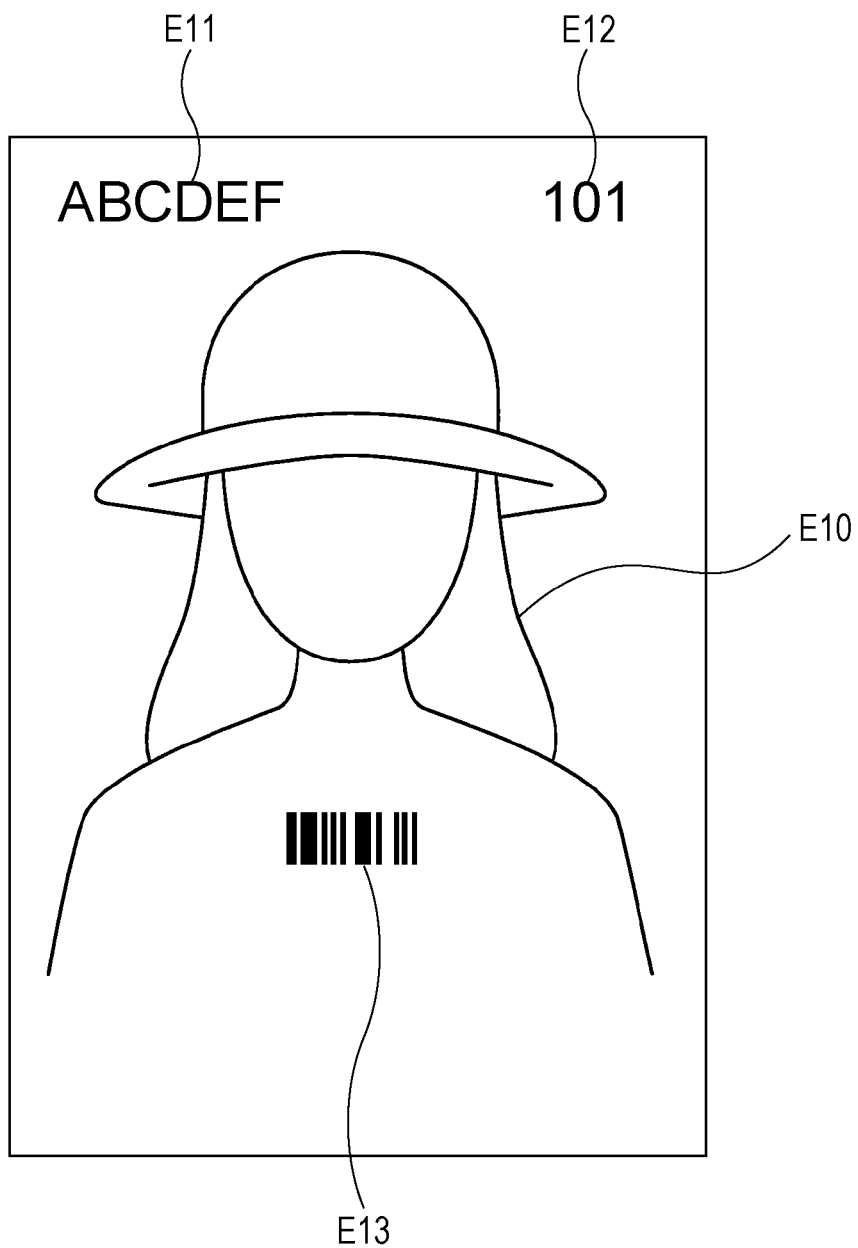
FIG. 1 is a diagram illustrating an example of an original image.

Hereinafter, configurations of an image inspection apparatus and an image inspection system as well as an image inspection method according to one or more embodiments of the present invention will be specifically described with reference to the drawings. However, the scope of the invention is not limited to the disclosed embodiments. Note that the present invention is not limited to the following example.

The image inspection apparatus and the image inspection system according to the present embodiment designates various areas such as an image inspection exclusion area, a print management area to be inspected, and a variable area in an image (hereinafter referred to as "original image") of an original that can be printed on a recording medium in final printing, on a user terminal outside the image inspection apparatus and/or an application loaded (installed) in the image inspection apparatus. Note that, as the application for designating the area, any application can be used as long as information such as coordinates of the designated area can be set.

By setting the designated areas such as the inspection exclusion area and the inspection target area separately in the application, the need to set the designated area for the read image of proof mode printing is eliminated. Hence, it is possible to prevent complication of the setting of designated area described above. By designating the area in the application at the time of generating the original image, operations to be performed on various images to be printed can be concentrated in one place. Further, in some applications, the area can be automatically designated from the contents of the input character string or number without designating the area. For this reason, by setting the various designated areas separately in the application, final printing can be immediately executed after execution of the proof mode printing (trial printing), and deterioration in productivity can be curbed.

However, when various designated areas are set separately in an application, in some image inspection systems, the orientation (top-bottom direction) of an original image at the time of setting the designated area (before printing) maybe different from the orientation of the original image in a read image after printing. The orientation of an original image in a read image after printing may be different from the orientation of the original image at the time of setting the designated area in a case where the original image is rotated from a desired orientation (at the time of setting the designated area) according to the scanning direction of a reading device, a case where the orientation of a recording medium (printing paper) is different from the orientation of the original image (short edge feed (SEF)/long edge feed (LEF)), and a case where a recording medium is reversed in a post-processing apparatus and the reading surface is changed (face up/down), so that the original image is rotated, for example. Such cases may lead to a problem that the various designated areas are not arranged in desired positions in the read image, and it is difficult to confirm that the designated areas are not arranged in the desired positions and to recalculate the positions in which to arrange the designated areas from the read image. Note that the above problem may also occur in a case where the original image is enlarged and printed, and a case where the original image is printed with its position shifted on the sheet, for example. Here, before describing the configurations of the image inspection apparatus and the image inspection system according to the present embodiment, the above-described problems will be specifically described with reference to the drawings.

FIG. 1 is a diagram illustrating an example of an original image. In the example illustrated in FIG. 1, an original image includes a person image E10, a character string image ("ABCDEF") formed in an upper left area E11 of the person image E10 in FIG. 1, a numeral string image ("101") formed in an upper right area E12 of the person image E10 in FIG. 1, and a barcode image formed in an area E13 near the chest of the person image E10. Note that the original image illustrated in FIG. 1 is commonly used in various image inspection examples to be described later.

Figure 2A:
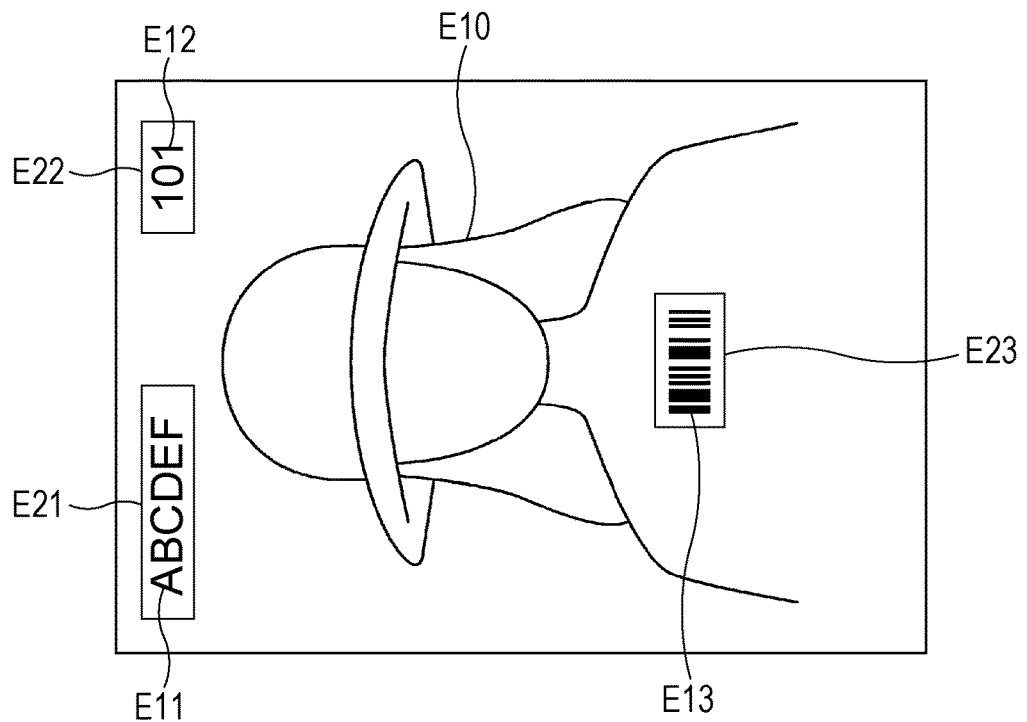
FIGS. 2A and 2B are diagrams illustrating a positional relationship among an original image and various designated areas in a read image at the time of execution of proof mode printing.
Figure 2B:
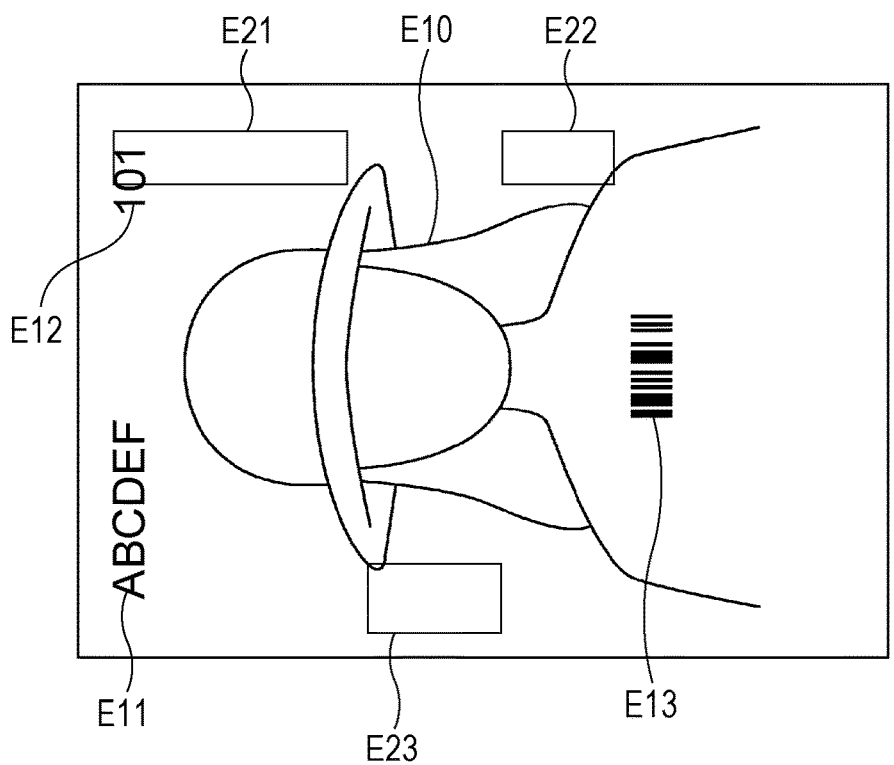

FIGS. 2A and 2B are diagrams illustrating a positional relationship between an original image and various designated areas in a read image at the time of executing proof mode printing. Note that rectangular areas E21 to E23 illustrated in FIGS. 2A and 2B are areas E11 to E13 designated in an application. FIG. 2A is a diagram illustrating a positional relationship between an original image and various designated areas when the orientation of the original image at the time of setting the designated areas (before printing) is the same as the orientation of the original image in the read image after proof mode printing. FIG. 2B is a diagram illustrating a positional relationship between the original image and various designated areas when the orientation of the original image in the read image after proof mode printing is rotated 270 degrees in the clockwise direction in FIG. 2B from the orientation of the original image at the time of setting the designated areas.

When the orientation of the original image at the time of setting the designated areas and the orientation of the original image in the read image after proof mode printing are the same, as illustrated in FIG. 2A, the areas E21 to E23 designated in the application respectively coincide with the areas E11 to E13 in the original image on the recording medium. However, when the orientation of the original image at the time of setting the designated areas and the orientation of the original image in the read image after proof mode printing are different, as illustrated in FIG. 2B, the areas E21 to E23 designated in the application do not respectively coincide with the areas E11 to E13 in the original image on the recording medium. Such inconsistency of designated areas causes problems in image inspection processing, such as a problem in which an inspection target area is designated as an area other than the desired area and dirt or the like in the desired area is not detected, or a problem in which an area to be excluded is erroneously designated as the inspection target area and unnecessary image inspection is executed, resulting in lower efficiency of the image inspection processing.

In view of the foregoing, in the image inspection apparatus and the image inspection system of the present embodiment, a designated area such as an inspection exclusion area and an inspection target area is separately set in an application, and in order to solve the problem that may occur with this configuration, a composite image of a read image of proof mode printing and an image indicating the designated area set in the application is displayed on a display unit such as a display panel, or a composite image of the original image and the designated area set in the application is printed on a recording medium. By providing such a function, the user can easily recognize an error (mismatch) in the designated area by checking the composite image. As will be described later, in the image inspection apparatus and the image inspection system of the present embodiment, there is also provided a function that enables easy correction of an arrangement position of a wrong designated area on the composite image to a desired position when there is a mistake (mismatch) in the designated area.

[Configuration of Image Inspection System]

Figure 3:
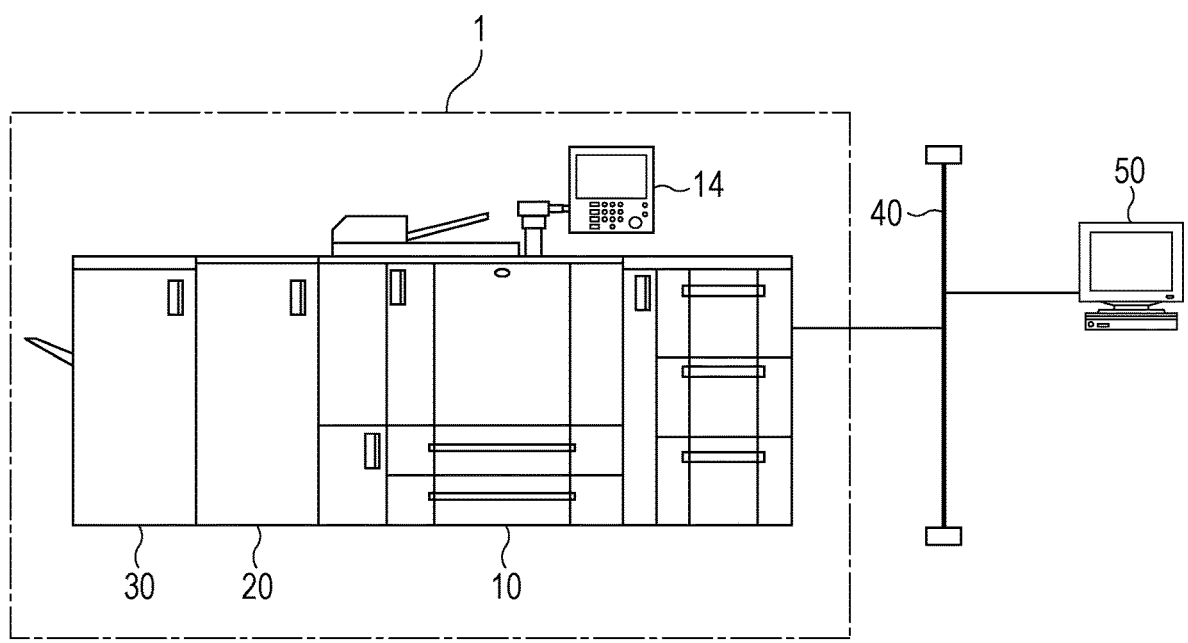
FIG. 3 is a diagram illustrating an external configuration of an image inspection system according to an embodiment of the present invention.

FIG. 3 is a diagram illustrating an external configuration of an image inspection system according to the present embodiment. As illustrated in FIG. 3, an image inspection system 1 includes a printer 10, an image reader 20, and a post processor 30. In the image inspection system 1, the printer 10, the image reader 20, and the post processor 30 are sequentially connected from the upstream side in the conveyance direction of a recording medium. The image inspection system 1 is connected to an external PC 50 through a communication network 40.

The image inspection system 1 performs raster image processing (RIP) processing on the basis of a print job input from the external PC 50 through the communication network 40, and forms an image on a recording medium such as printing paper on the basis of image data after the RIP processing. Then, the image inspection system 1 reads the image formed on the recording medium, and compares the image that has been read with a reference image for image inspection to perform image inspection. The image inspection system 1 of the present embodiment also has a function (function of checking correctness of designated area with respect to original image) of displaying a composite image of a read image of proof mode printing and an image indicating the designated area to check whether or not an inspection target area and an inspection exclusion area are arranged in desired positions. Note that the composite image can be displayed on an operation display 14 provided in the image inspection system 1 and/or a display screen of the external PC 50.

The printer 10 is an example of an image forming apparatus that forms an image on a recording medium by an electrophotographic scheme, for example. The printer 10 includes components necessary for image formation, and prints an image on a recording medium designated by a print job. Specifically, the printer 10 performs processing of forming an electrostatic latent image by irradiating a photosensitive drum charged with a charging device with light corresponding to an image from an exposure device, attaching the charged toner and developing an image with a developing device, performing primary transfer of the toner image to a transfer belt, performing secondary transfer of the toner image from the transfer belt to a recording medium, and fixing the toner image on the recording medium with a fixing device. The recording medium on which the image is formed is ejected to the image reader 20.

The image reader 20 forms an image of reflected light from the recording medium ejected from the printer 10 on a light receiving surface of a charge coupled device (CCD) sensor (not illustrated), reads the image on the recording medium, and generates read image data. Then, the printer 10 performs image inspection processing by comparing the read image with a reference image for image inspection.

The post processor 30 ejects the recording medium from which an image has been read by the image reader 20 to an ejection tray. Note that there may be any number of ejection trays. In a case where some kind of post-processing is designated in a print job, the post processor 30 performs the designated post-processing on the recording medium, and then ejects the recording medium to the ejection tray.

The communication network 40 is a communication network such as a local area network (LAN) or a wide area network (WAN) defined by standards such as Ethernet (registered trademark), token ring, and fiber-distributed data interface (FDDI).

The external PC 50 is a computer on which a user can generate a print job. The print job (including original image) generated by the external PC 50 is transmitted to the image inspection system 1 through the communication network 40. The external PC 50 includes an application that enables setting of various designated areas, such as an inspection exclusion area and an inspection target area (print management area and variable area), for an original image. Hence, the user can set (designate) various types of data regarding the coordinates of each designated area for the original image in the application on the external PC 50. Then, in the present embodiment, the data (including coordinate data and the like) of the designated area set by the external PC 50 is transmitted, together with the data of the print job, to the image inspection system 1 through the communication network 40.

Note that, in the present embodiment, the printer 10 includes an inspection function for a read image, a function of checking the correctness of a designated area (inspection target area and inspection exclusion area) with respect to an original image, and the like. That is, in the present embodiment, since the printer 10 has a function as an image inspection apparatus, an example in which the image inspection system 1 includes the printer 10, the image reader 20, and the post processor 30 will be described. However, the present invention is not limited to this example. For example, a configuration (image inspection device) having a function as an image inspection apparatus may be provided outside the printer 10, and the image inspection system 1 may include the printer 10, the image reader 20, the post processor 30, and the image inspection device.

[Configuration of Image Inspection Apparatus]

Figure 4:
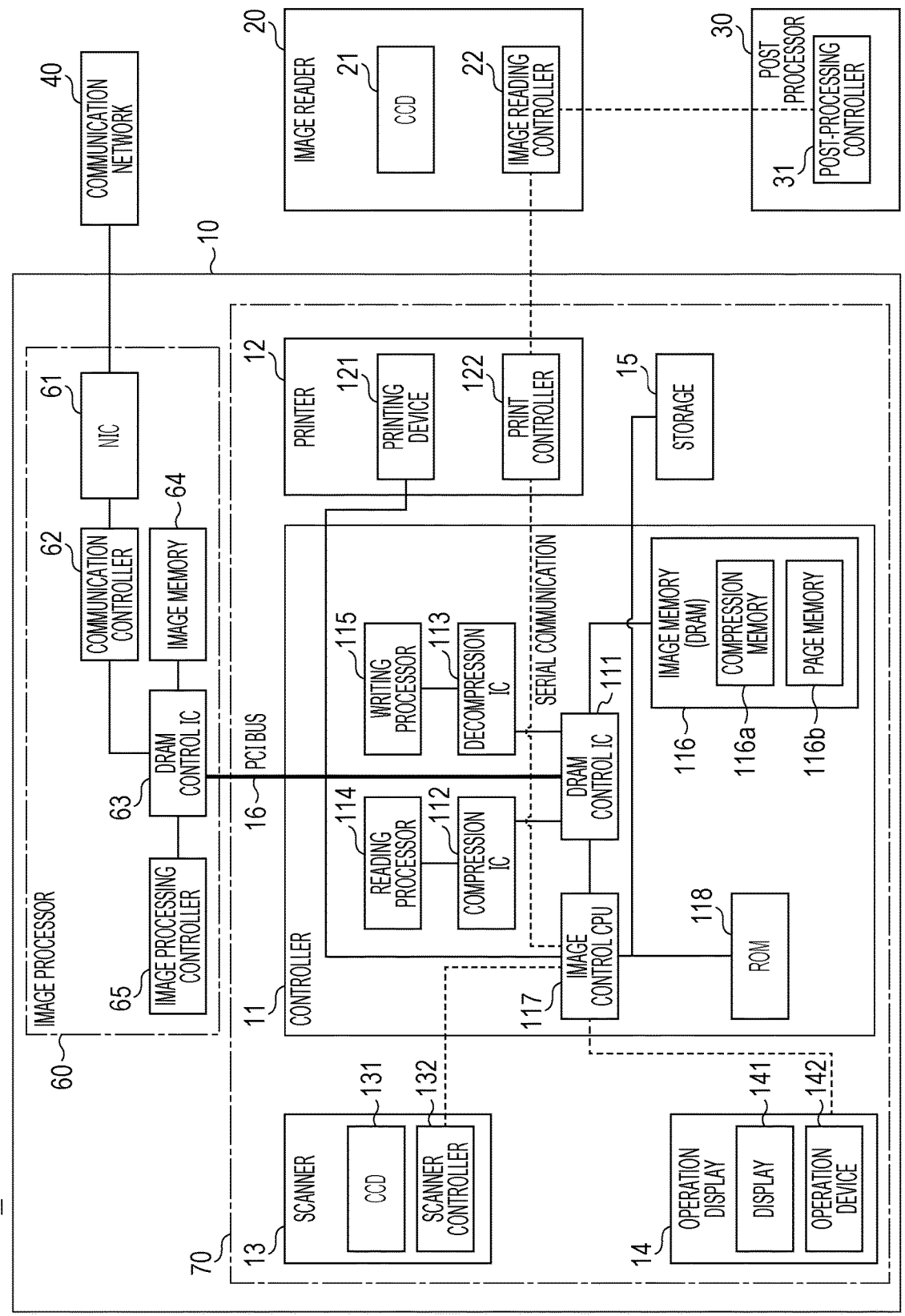
FIG. 4 is a diagram illustrating an internal configuration of an image inspection apparatus according to the embodiment of the present invention.

FIG. 4 is a diagram illustrating a configuration of an image inspection apparatus according to the present embodiment. Note that, in the present embodiment, a group of components related to the operation of the function (image inspection function) of checking the correctness of a designated area (inspection target area and inspection exclusion area) with respect to an original image is referred to as an image inspection apparatus.

As illustrated in FIG. 4, an image inspection apparatus 2 includes the printer 10, the image reader 20, and the post processor 30. The printer 10 (print controller 122 to be described later) is serially communicably connected to the image reader 20 (image reading controller 22 to be described later), and the image reader 20 (image reading controller 22 to be described later) is serially communicably connected to the post processor 30 (post-processing controller 31 to be described later).

The printer 10 has the image processor 60 (designated area acquisition device) and an image forming device 70. The image processor 60 is connected to the external PC 50 through the communication network 40. The image processor 60 is also connected to the image forming device 70 through a peripheral component interconnect (PCI) bus 16.

(1) Image Processor 60

The image processor 60 acquires data of a print job and data (including coordinate data and the like) of a designated area (inspection target area and inspection exclusion area) for an original image from the external PC 50 through the communication network 40. The image processor 60 performs RIP processing on image data of an original image included in the data of the print job to generate image data for printing. The generated image data for printing is output to a controller 11 described later of the image forming device 70, through the PCI bus 16.

As illustrated in FIG. 4, the image processor 60 has a network interface card (NIC) 61, a communication controller 62, a dynamic random access memory (DRAM) control integrated circuit (IC) 63, an image memory 64, and an image processing controller 65. The NIC 61 is communicably connected to the external communication network 40. The communication controller 62 is connected to the NIC 61. The DRAM control IC 63 is connected to the communication controller 62, the image memory 64, and the image processing controller 65.

The NIC 61 is an interface for connecting the image processor 60 and the external communication network 40. The communication controller 62 controls communication processing performed between the image processor 60 and the external PC 50 connected to the image processor 60 through the communication network 40. The DRAM control IC 63 stores the data of a print job, the data of a designated area for an original image, and the like received from the external PC 50 in the image memory 64. The DRAM control IC 63 also outputs the data of a print job and the data of a designated area to the controller 11 through the PCI bus 16. The image processing controller 65 performs RIP processing on image data of an original image included in the data of a print job to generate image data for printing.

(2) Image Forming Device 70

The image forming device 70 forms (prints) an image on a recording medium on the basis of data of a print job input from the image processor 60. The image forming device 70 also performs image inspection processing on the recording medium on which the image is formed. For example, the image forming device 70 performs inspection processing on a read image, processing of checking the correctness of a designated area (inspection target area and inspection exclusion area) with respect to an original image, and the like.

As illustrated in FIG. 4, the image forming device 70 has the controller 11, a printer 12, a scanner 13, the operation display 14, and a storage 15. The controller 11 is connected to the printer 12, the scanner 13, the operation display 14, and the storage 15. Note that, in the present embodiment, a later-described image control CPU 117 of the controller 11 is serially communicably connected to the later-described print controller 122 of the printer 12, a later-described scanner controller 132 of the scanner 13, and the operation display 14.

The controller 11 controls various processing in the image inspection apparatus 2. The controller 11 controls, for example, image forming processing, recording medium conveyance processing, image inspection processing, and the like.

As illustrated in FIG. 4, the controller 11 has a DRAM control IC 111, a compression IC 112, a decompression IC 113, a reading processor 114, a writing processor 115, an image control central processing unit (CPU) 117, an image memory (DRAM) 116, and a read only memory (ROM) 118.

The DRAM control IC 111 acquires data of a print job and data (including coordinate data and the like) of a designated area (inspection target area and inspection exclusion area) for an original image from the image processor 60 through the PCI bus 16. Note that in a case where an application that allows the user to set a designated area for an original image is installed in the image inspection apparatus 2, the user can set the designated area in the application through the operation display 14. Hence, in this case, the DRAM control IC 111 acquires data of the designated area for the original image from the operation display 14.

The compression IC 112 compresses data of an original image included in print job data. The decompression IC 113 decompresses data of a compressed original image stored in a later-described compression memory 116a of the image memory 116. The reading processor 114 reads data to be processed from the image memory 116. The writing processor 115 writes the data of an original image compressed by the compression IC 112 and the image data decompressed by the decompression IC 113 in the later-described compression memory 116a and a later-described page memory 116b of the image memory 116, respectively. The writing processor 115 also writes the acquired data (including coordinate data and the like) of a designated area for the original image in the page memory 116b.

The image control CPU 117 controls various processing related to image formation and image inspection. For example, the image control CPU 117 controls processing of supplying a recording medium by a recording medium supply device (not illustrated), controls image forming processing by the image forming device 70 based on a print instruction of a user given through the operation display 14 to be described later, and controls image inspection processing or the like of a recording medium on which an image is formed on the basis of an image inspection program stored in the storage 15.

The image memory 116 includes a storage medium of a volatile memory such as a DRAM, and temporarily stores information (image data and the like) necessary for each processing performed by the image control CPU 117. As illustrated in FIG. 4, the image memory 116 has the compression memory 116a and the page memory 116b. The compression memory 116a stores data of an original image compressed by the compression IC 112. The page memory 116b stores data of an original image decompressed by the decompression IC 113. The page memory 116b temporarily stores not only data of an original image but also various data acquired and generated by image inspection processing to be described later. Specifically, The page memory 116b stores data of a designated area for the original image, data of a read image output from the image reader 20, data of a composite image of a later-described image (e.g., later-described rectangular frame image: hereinafter referred to as "designated area image") that makes a range of the designated area visually recognizable and the read image, and data of a composite image of the later-described designated area image and the original image.

The ROM 118 includes, for example, a storage medium such as a nonvolatile memory, and the ROM 118 can store programs, data, and the like executed and referred to by the image control CPU 117.

The printer 12 has a function of forming (printing) an image on a recording medium. As illustrated in FIG. 4, the printer 12 has a printing device 121 and the print controller 122.

The printing device 121 forms an image on a recording medium. The printing device 121 includes four image forming devices that form toner images of four colors of Y, M, C, and K, a transfer device that transfers the toner image to a recording medium, and a fixer that fixes the toner image on the recording medium. The image forming device of each color includes a photosensitive drum, and a developing device that irradiates a surface of the photosensitive drum with light corresponding to an image to form an electrostatic latent image on a circumference of the photosensitive drum, and forms a toner image on the photosensitive drum by attaching toner to the electrostatic latent image. The transfer device transfers the image formed on the photosensitive drum of the image forming device of each color to a recording medium. The fixer performs fixing processing on the image transferred to the recording medium. The print controller 122 controls the operation of each component of the printing device 121.

The scanner 13 is an example of an image reading device including an image sensor and the like, and reads an image formed on a recording medium. As illustrated in FIG. 4, the scanner 13 has a CCD 131 and the scanner controller 132. Under the control of the scanner controller 132, the scanner 13 optically scans a recording medium on which an image is formed, and forms an image of reflected light from the recording medium on a light receiving surface of a sensor of the CCD 131 to read the image.

The operation display 14 includes a display 141 including a display device such as a liquid crystal display (LCD) or an organic electro-luminescence (EL) display, and an operation device 142. Note that the operation device 142 is provided not only with various buttons operated by the user (see FIG. 3), but also a touch sensor and the like, and is provided with a function (touch operation function) that enables execution of a predetermined operation by a user's touch operation on a display screen of the display 141. Then, in the present embodiment, the display 141 and a part (touch operation function) of the operation device 142 are integrally formed as a touch panel, for example. Note that, in the present embodiment, the operation device 142 may additionally include an operation unit such as a mouse or a tablet, or the operation device 142 may include a keyboard, a mouse, a tablet, or the like instead of the touch operation function and be configured separately from the display 141.

The operation display 14 generates an operation signal representing the operation content from the user input to the operation device 142, and outputs the operation signal to the image control CPU 117 described later. The operation display 14 also displays, on the display 141, for example, contents of operation by the user, setting information, a composite image of the designated area image and a read image, and the like on the basis of a display instruction signal from the image control CPU 117. Note that the operation device 142 may include a mouse, a tablet, or the like, and may be configured separately from the display 141.

The storage 15 includes a non-transitory computer readable recording medium storing a program executed by the image control CPU 117, and includes a storage device such as a hard disk drive (HDD). The storage 15 stores programs and data such as a program (e.g., image inspection program) for the image control CPU 117 to control each device, an operating system (OS), and a controller. Note that some of the programs and data stored in the storage 15 may be stored in the ROM 118. The non-transitory computer readable recording medium storing the program executed by the image control CPU 117 is not limited to an HDD, and may be, for example, a recording medium such as a solid state drive (SSD), a compact disc (CD)-ROM, or a digital versatile disc (DVD)-ROM.

(3) Image Reader 20

The image reader 20 reads an image on a recording medium ejected from the image forming device 70. The image reader 20 is an example of an image reading device including an image sensor and the like, and includes a CCD 21 and the image reading controller 22 as illustrated in FIG. 4. The image reader 20 forms an image of reflected light from the recording medium ejected from the printer 12 of the image forming device 70 on a light receiving surface of the CCD 21, reads the image on the recording medium, and generates a read image. The read image is output to the image forming device 70. The image reading controller 22 controls a reading operation of the image reader 20.

(4) Post Processor 30

As illustrated in FIG. 4, the post processor 30 includes a post-processing controller 31. The post-processing controller 31 controls various operations in the post processor 30. Specifically, the post-processing controller 31 controls an operation of ejecting a recording medium from which an image has been read by the image reader 20 to the ejection tray, or an operation of some kind of designated post-processing when the post-processing is designated in a print job, for example.

[Configuration of Functional Block Related to Image Inspection Processing]

Figure 5:
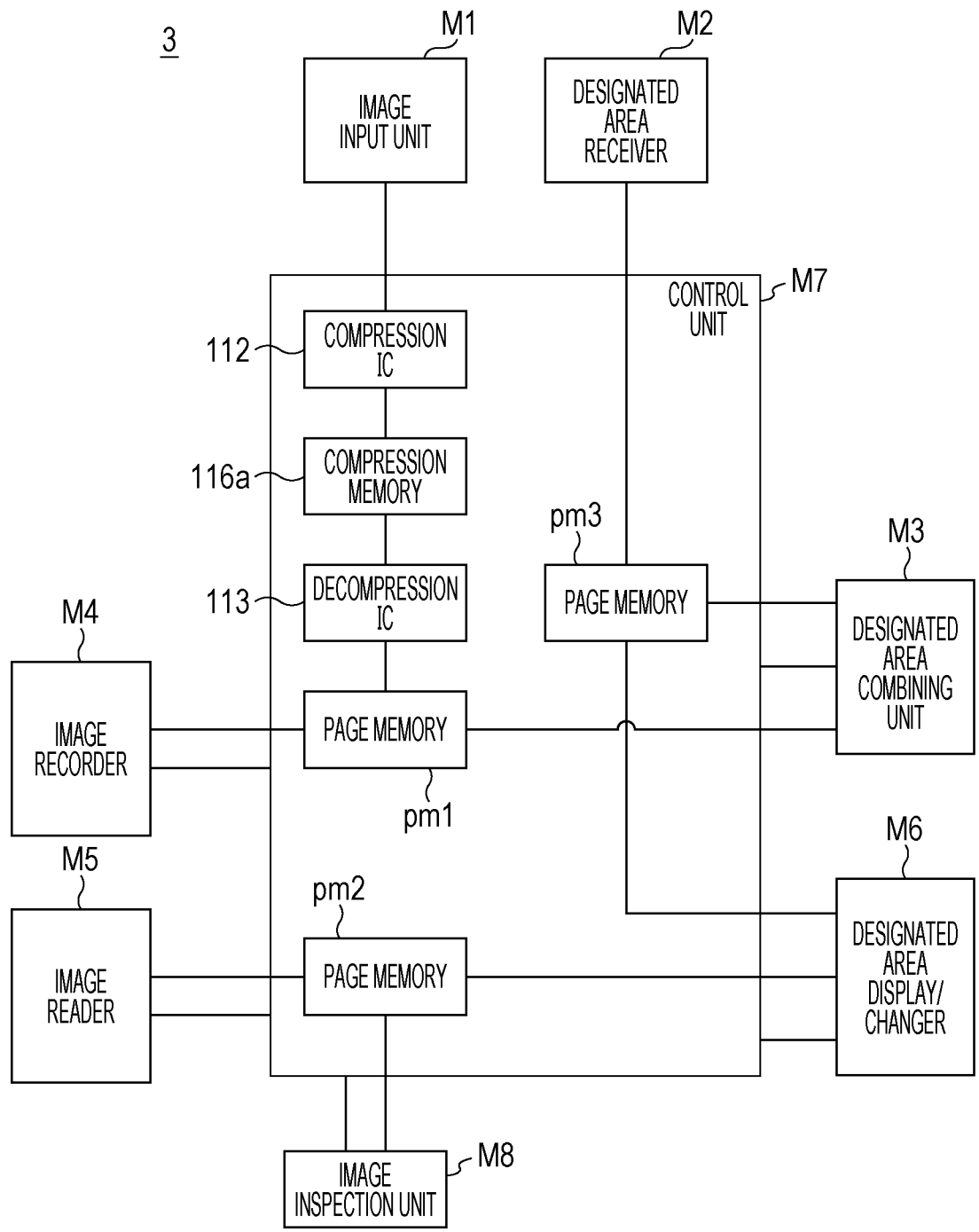
FIG. 5 is a configuration diagram of functional blocks related to image inspection processing in the image inspection apparatus according to the embodiment of the present invention.

Next, a configuration of functional blocks related to image inspection processing in the image inspection apparatus 2 (image inspection system 1) of the present embodiment will be described. FIG. 5 is a configuration diagram of functional blocks related to image inspection processing in the image inspection apparatus 2 of the present embodiment. In the functional blocks illustrated in FIG. 5, functional blocks that coincide with the components illustrated in FIG. 4 are denoted by the same names and reference numerals. Note that the function (designated area correctness checking function and designated area modification (correction) function) of the image inspection processing described below may be configured by software or hardware.

As illustrated in FIG. 5, as functional blocks related to image inspection processing in the image inspection apparatus 2, there are provided an image input unit M1, a designated area receiver M2, a designated area combining unit M3, an image recorder M4, an image reader M5, a designated area display/changer M6, a control unit M7, and an image inspection unit M8.

Note that the control unit M7 in FIG. 5 is provided with blocks of three page memories pm1, pm2, and pm3. These page memories are included in the page memory 116*b* illustrated in FIG. 4, and the page memories in the page memory 116*b* have different addresses. In the example illustrated in FIG. 5, for convenience of description, blocks of the page memory are illustrated separately for each type of data to be stored. Specifically, the page memory pm1 stores data of an original image, data of a composite image of the designated area (inspection target area and inspection exclusion area) image and an original image, and the like. The page memory pm2 stores data of a read image, data of a composite image of the designated area image and the read image, and the like. The page memory pm3 stores data (including coordinate data and the like) of the designated area for the original image and data of the designated area image. Note that although not illustrated, the control unit M7 controls the image control CPU 117 to generate data of the designated area image, and stores the data in the page memory pm3.

The image input unit M1 is included in the image processor 60, and acquires data (included in print job data) of an original image from the external PC 50 through the communication network 40. The acquired data of the original image is output to the control unit M7.

The designated area receiver M2 is included in the image processor 60 (designated area acquisition device), and acquires data (including coordinate data and the like) of a designated area (inspection target area and inspection exclusion area) for the original image from the external PC 50 through the communication network 40. The acquired data of the designated area is output to the control unit M7 (page memory pm3). Note that in a case where an application that allows the user to set a designated area for an original image is installed in the image inspection apparatus 2, the user can set the designated area in the application through the operation display 14 of the image inspection apparatus 2. Hence, the designated area receiver M2 is included in the image forming device 70 (image control CPU 117).

The designated area combining unit M3 is included in the image forming device 70 (image control CPU 117). When proof mode printing (trial printing) is instructed in a second inspection operation to be described later, the designated area combining unit M3 acquires an image (e.g., rectangular frame image to be described later) of the designated area for the original image stored in the page memory pm3 and the original image stored in the page memory pm1, and generates a composite image of the two images. Then, in the second inspection operation to be described later, the generated composite image is output to the control unit M7 (page memory pm1).

The image recorder M4 is included in the printer 12. Upon receipt of a print instruction from the control unit M7, the image recorder M4 prints an original image stored in the page memory pm1 (at time of first inspection operation to be described later) or a composite image of the designated area image and the original image (at time of second inspection operation to be described later) on a recording medium. Upon completion of the printing, the image recorder M4 notifies the control unit M7 of the completion of the printing.

The image reader M5 is included in the image reader 20. Upon receipt of an image reading instruction from the control unit M7, the image reader M5 reads the image formed on the recording medium by the image recorder M4. Upon completion of reading of the image, the image reader M5 notifies the control unit M7 of the completion of the reading, and outputs the image that has been read (read image) to the control unit M7 (page memory pm2).

The designated area display/changer M6 (area image selector, area information changer) is included in the operation display 14. When display of a composite image of a read image at the time of proof mode printing and a designated area image is instructed in a first inspection operation to be described later, the designated area display/changer M6 acquires the image of the designated area for the original image stored in the page memory pm3 and the read image at the time of proof mode printing stored in the page memory pm2, and displays the composite image of the two images on the display 141. When the user checks the composite image of the designated area image displayed on the display 141 and the read image at the time of proof mode printing and the designated area needs to be corrected, the user can correct the designated area using the display 141 and/or the operation device 142 of the operation display 14. The corrected data (including coordinate data and the like) of the designated area for the original image is output to the control unit M7 (page memory pm3). The composite image of the corrected designated area image and the read image at the time of proof mode printing is output to the control unit M7 (page memory pm2).

Note that, in the present embodiment, it is also possible to display, on the display screen of the external PC 50, the composite image of the image of the designated area for the original image and the read image. In this case, the user can check the composite image displayed on the external PC 50, and if the designated area needs to be corrected, the user can also correct the designated area using the external PC 50. Hence, in this case, the designated area display/changer M6 is included in the external PC 50.

The control unit M7 is included in the controller 11. The control unit M7 compresses the original image acquired by the image input unit M1 with the compression IC 112, and stores the compressed image in the compression memory 116*a*. The control unit M7 decompresses the compressed original image stored in the compression memory 116*a* with the decompression IC 113, and stores the decompressed image in the page memory pm1. The control unit M7 stores, in the page memory pm3, data (including coordinate data and the like) of the designated area for the original image acquired by the image input unit M1. In the second inspection operation to be described later, when proof mode printing is instructed, the control unit M7 stores, in the page memory pm1, data of the composite image of the designated area image and the original image generated by the designated area combining unit M3. In the second inspection operation to be described later, the control unit M7 outputs the composite image of the designated area image and the original image to the image recorder M4, and issues a print instruction. When final printing is instructed, the control unit M7 outputs the original image stored in the page memory pm1 to the image recorder M4, and issues a print instruction.

In the first inspection operation to be described later, when proof mode printing is instructed, the control unit M7 controls the image control CPU 117 to instruct the image reader M5 to read the image formed on the recording medium by the image recorder M4, and stores the read image input from the image reader M5 in the page memory pm2. In the first inspection operation to be described later, when proof mode printing is instructed, the control unit M7 outputs the read image stored in the page memory pm2 and the designated area image corresponding to the original image of the read image stored in the page memory pm3 to the designated area display/changer M6, and outputs a display instruction of a composite image of the two images. The control unit M7 stores data of the composite image of the designated area image and the read image in the page memory pm2.

When the designated area is corrected in the designated area display/changer M6 on which the composite image of the designated area image and the read image is displayed, the control unit M7 updates data (including coordinate data and the like) of the designated area stored in the page memory pm3 with data of the corrected designated area. At this time, the control unit M7 not only updates the data of the designated area image stored in the page memory pm3 with the data of the corrected designated area image, but also updates data of the composite image of the designated area image and the read image stored in the page memory pm2 with data of the corrected composite image of the designated area image and the read image.

Further, after execution of the final printing, the control unit M7 issues an instruction to perform image inspection on the recording medium printed in the final printing to the image inspection unit M8, and outputs the read image of the final printing stored in the page memory pm2.

The image inspection unit M8 is included in the controller 11 (image control CPU 117). Upon receipt of an image inspection instruction from the control unit M7, the image inspection unit M8 collates the read image of the final printing stored in the page memory pm2 with the reference image, and performs image inspection processing on the recording medium printed in the final printing. In the image inspection processing, the image inspection unit M8 collates the read image with the reference image to inspect whether there is a defect in the read image. In a case where a designated area is provided for the original image, the image inspection unit M8 performs inspection processing or inspection exclusion processing according to the type of the designated area in the image inspection processing.

[First Inspection Operation (First Designated Area Checking Function)]

Next, a first inspection operation (checking operation) of a designated area for an original image performed at the time of execution of proof mode printing (trial printing) and an image inspection operation performed in final printing in the image inspection apparatus 2 (image inspection system 1) of the present embodiment will be described. In the first inspection operation (checking operation) of a designated area, first, the designated area display/changer M6 displays a composite image of an image of a designated area (inspection target area and inspection exclusion area) set for an original image on the external PC 50 or the application loaded (installed) in the image inspection apparatus 2 and the read image at the time of proof mode printing. Then, on the display screen of the designated area display/changer M6, the user checks the arrangement position of the designated area, determines whether the position of the designated area is correct (correctness check), and corrects the arrangement position of the designated area as necessary.

Figure 6:
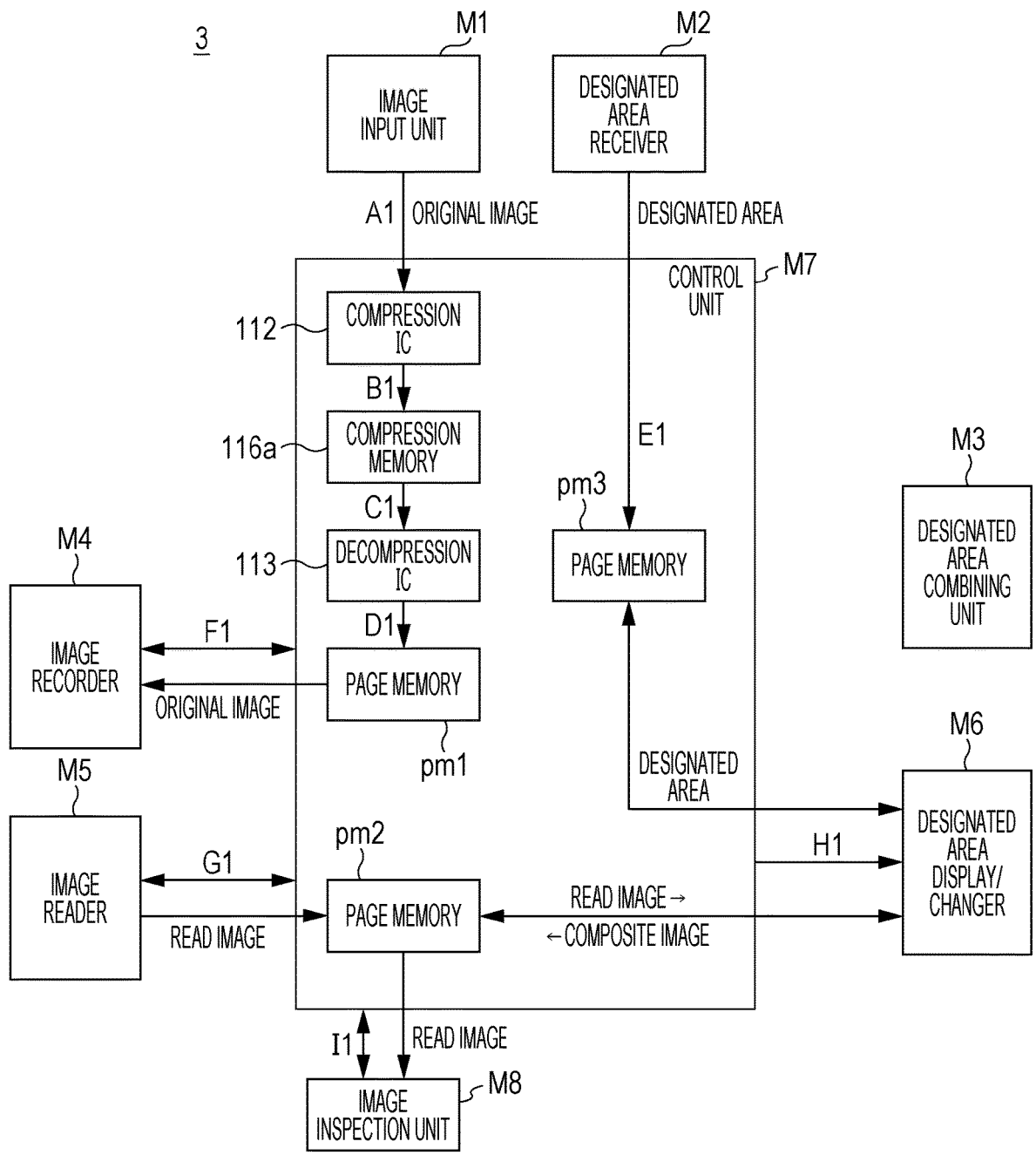
FIG. 6 is a diagram illustrating the flow of data and instruction signals among functional blocks in a first inspection operation in the image inspection apparatus according to the embodiment of the present invention.

FIG. 6 is a diagram illustrating the flow of data and instruction signals among functional blocks in the first inspection operation (checking operation) of a designated area for an original image and the image inspection operation performed in final printing. Note that the functional blocks illustrated in FIG. 6 are similar to the functional blocks described in FIG. 5, and are therefore denoted by the same reference numerals.

In the first inspection operation (checking operation) of a designated area, as illustrated in FIG. 6, the control unit M7 first receives an original image from the image input unit M1 (image processor 60) (operation A1). Next, the control unit M7 (compression IC 112) compresses the received original image and stores the compressed image in the compression memory 116a (operation B1). Next, the control unit M7 (decompression IC 113) decompresses the compressed original image stored in the compression memory 116a and stores the decompressed image in the page memory pm1 (operations C1 and D1).

In the first inspection operation (checking operation) of a designated area, the control unit M7 receives data (including coordinate data and the like) of the designated area for the original image acquired from the image input unit M1 (image processor 60), and stores the received data of the designated area in the page memory pm3 (operation E1). Note that the operation from the reception of the data of the designated area to the storage thereof in the page memory pm3 indicated by the operation E1 may be performed in parallel with the operation from the reception of the data of the original image to the storage thereof in the page memory pm1 indicated by the operations A1 to D1, or the operation E1 may be performed after or before the operations A1 to D1.

In the first inspection operation (checking operation) of a designated area, after the decompressed original image is stored in the page memory pm1, the control unit M7 issues a print instruction of the original image to the image recorder M4 (printer 12) (operation F1). Note that at this time, the control unit M7 outputs the decompressed original image to the image recorder M4. Next, upon completion of the instructed printing, the image recorder M4 (printer 12) notifies the control unit M7 of the completion of printing (operation F1).

Next, in the first inspection operation (checking operation) of a designated area, upon receipt of a notification of print completion from the image recorder M4, the control unit M7 issues an instruction to read the image formed on the recording medium to the image reader M5 (operation G1). Then, upon completion of the reading of the image, the image reader M5 notifies the control unit M7 of the completion of the reading (operation G1), and outputs the read image to the control unit M7. The control unit M7 stores the read image input from the image reader M5 in the page memory pm2.

Next, in the first inspection operation (checking operation) of a designated area, the control unit M7 issues a display instruction of a composite image of the designated area image and the read image to the designated area display/changer M6 (operation display 14) (operation H1). At this time, the control unit M7 generates data of the received designated area image and stores the data in the page memory pm3.

Upon receipt of the display instruction of the composite image, the designated area display/changer M6 (operation display 14) acquires the read image stored in the page memory pm2 and the designated area image corresponding to the original image of the read image stored in the page memory pm3, and displays the composite image. Next, when the user checks the composite image and corrects the designated area on the designated area display/changer M6, the control unit M7 rewrites data of the designated area before correction stored in the page memory pm3 is rewritten with data of the designated area after correction. Note that at this time, the designated area display/changer M6 displays a composite image of the corrected designated area image and the read image. At this time, the control unit M7 stores the data of the corrected designated area image in the page memory pm3, and stores data of the composite image of the corrected designated area image and the read image in the page memory pm2.

After execution of the final printing, the control unit M7 issues an image inspection instruction to the image inspection unit M8 (operation I1). The image inspection unit M8 checks whether there is a defect in the read image by collating the read image of the recording medium printed in the final printing with the reference image. In a case where a designated area is provided for the original image, the image inspection unit M8 performs inspection processing or inspection exclusion processing according to the type of the designated area in the image inspection processing.

[Image Inspection Processing Including First Inspection Operation]

Figure 7:
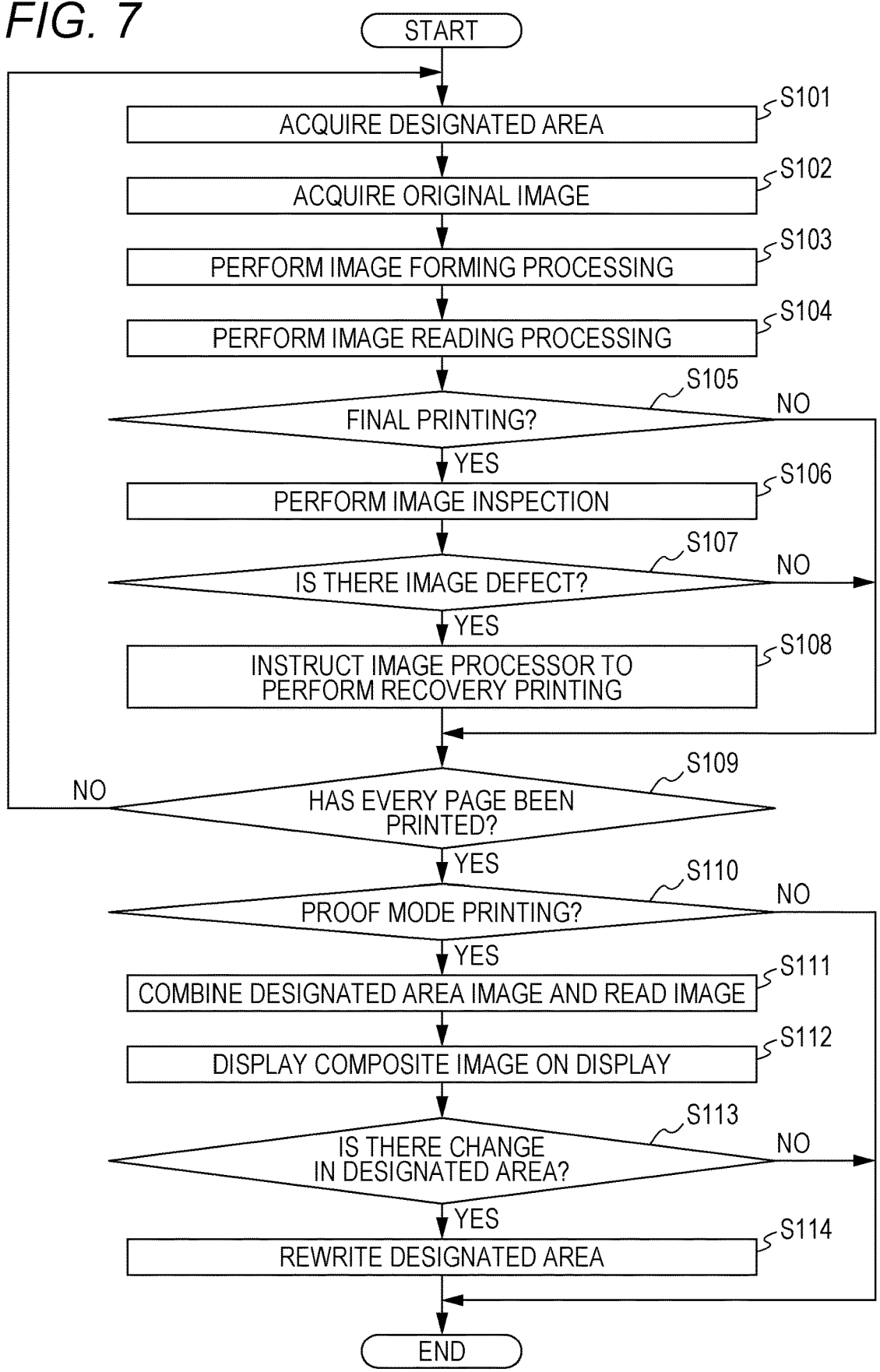
FIG. 7 is a flowchart illustrating a procedure of image inspection processing in the first inspection operation in the image inspection processing according to the embodiment of the present invention.

Next, a procedure of image inspection processing (image forming processing) including the first inspection operation performed by the image inspection apparatus 2 (image inspection system 1) of the present embodiment will be described. FIG. 7 is a flowchart illustrating a procedure of image inspection processing (image forming processing) including the first inspection operation performed in the present embodiment.

In the image inspection apparatus 2, when the image processor 60 receives data of a print job from the external PC 50 through the communication network 40, image inspection processing is started.

First, the controller 11 acquires data (coordinate data and the like) of a designated area (inspection target area and inspection exclusion area) set for an original image (step S101). In the processing, the controller 11 acquires data of the designated area set for the original image on the external PC 50 or the application loaded in the image inspection apparatus 2. The acquired data of the designated area is stored in the page memory 116b of the image memory 116.

Next, the controller 11 acquires data of the original image (step S102). In the processing, the controller 11 compresses the data of the original image included in data of a print job received from the image processor 60 and stores the data in the compression memory 116a, and decompresses the compressed original image stored in the compression memory 116a and stores the image in the page memory 116b.

Next, the controller 11 performs image forming processing (step S103). In the processing, the controller 11 outputs the data of the original image to the printer 12 and issues a print instruction of the original image to the printer 12. Upon receipt of the print instruction from the controller 11, the printer 12 prints the original image on a recording medium supplied by a recording medium supply device (not illustrated) of the printing device 121. The recording medium on which the image is printed is output to the image reader 20. Upon completion of the printing, the printer 12 notifies the controller 11 of the completion.

Next, the controller 11 performs image reading processing (step S104). In the processing, first, upon receipt of a notification of print completion from the printer 12, the controller 11 issues an instruction to read the image printed on the recording medium to the image reader 20. Upon receipt of the image reading instruction from the controller 11, the image reader 20 reads the image printed on the recording medium ejected to the image reader 20. Then, the controller 11 acquires the image (read image) read by the image reader 20 and stores the image in the page memory 116b of the image memory 116.

Next, the controller 11 determines whether the printing executed in the processing of step S103 is final printing (step S105).

In the processing of step S105, if it is determined that the printing of step S103 is not final printing (NO in step S105), the controller 11 performs processing of step S109 described later.

On the other hand, in the processing of step S105, if the controller 11 determines that the printing of step S103 is final printing (YES in step S105), the controller 11 performs image inspection (step S106). In the processing, the controller 11 performs collation processing between the read image obtained in the process of step S104 and a reference image prepared in advance, and inspects whether there is a defect in the read image. In a case where a designated area is provided for the original image, inspection processing or inspection exclusion processing according to the type of each designated area is performed in the image inspection processing of step S104.

Next, based on the result of the image inspection of step S106, the controller 11 determines whether there is an image defect (step S107).

In the process of step S107, if the controller 11 determines that there is no image defect (NO in step S107), the controller 11 performs processing of step S109 described later.

On the other hand, in the processing of step S107, if the controller 11 determines that there is an image defect (YES in step S107), the controller 11 issues a recovery printing instruction to the image processor 60 (step S108).

After the processing of step S108, if it is determined NO in the processing of step S105 or NO in the processing of step S107, the controller 11 determines whether printing has been completed for every page (step S109).

In the processing of step S109, if the controller 11 determines that printing has not been completed for every page of the original image (NO in step S109), the controller 11 returns to the processing of step S101 and repeats the processing of steps S101 to S109.

On the other hand, in the processing of step S109, if the controller 11 determines that printing has been completed for every page of the original image (YES in step S109), the controller 11 determines whether the printing executed in the processing of step S103 is proof mode printing (trial printing) (step S110).

In the processing of step S110, if the controller 11 determines that the printing of step S103 is not proof mode printing (NO in step S110), the controller 11 ends the image inspection processing.

On the other hand, in the processing of step S110, if the controller 11 determines that the printing of step S103 is proof mode printing (YES in step S110), the controller 11 combines the designated area image and the read image to generate a composite image (step S111). In the processing, the controller 11 issues a display instruction of the composite image to the operation display 14, generates a designated area image (e.g., rectangular frame image to be described later) on the basis of the data of the designated area acquired in the processing of step S101, and combines the generated designated area image and the read image obtained in the processing of step S104 to generate a composite image. The controller 11 also stores data of the generated designated area image and composite image in the page memory 116b of the image memory 116. Note that the designated area image may be generated when the data of the designated area is acquired in the processing of step S101.

Next, the controller 11 controls the operation display 14 to display the composite image generated in the processing of step S111 (step S112). In the processing, upon receipt of the display instruction of the composite image from the controller 11, the operation display 14 displays the input composite image on the display 141. Note that while an example in which the generated composite image is input to the operation display 14 to display the composite image has been described here, the present invention is not limited to this example. The designated area image and the read image obtained by the processing of step S104 may be input separately (without combining) to the operation display 14, and the composite image may be displayed by superimposing both images on the operation display 14.

Next, the controller 11 determines whether the designated area has been changed in the composite image displayed on the operation display 14 (step S113). In the processing, the controller 11 determines whether an operation signal corresponding to a change in the designated area has been received from the operation display 14 (whether user has performed correction operation of designated area using operation display 14). Then, if the user has performed a correction operation of the designated area, it is determined YES in step S113, and if not, it is determined NO in step S113.

In the processing of step S113, if the controller 11 determines that the designated area has not been changed (NO in step S113), the controller 11 ends the image inspection processing.

On the other hand, in the processing of step S113, if the controller 11 determines that the designated area has been changed (YES in step S113), the controller 11 performs processing of rewriting data of the designated area (step S114). In the processing, the controller 11 rewrites the data (coordinate data and the like) of the designated area before change stored in the page memory 116b of the image memory 116 with the data (coordinate data and the like) of the designated area after change. At this time, a composite image of the changed designated area image and the read image is generated, and the data of the changed designated area image and composite image is stored in the page memory 116b. Then, after executing the rewriting processing of the data of the designated area, the controller 11 ends the image inspection processing.

Display Example 1 of Composite Image in First Inspection Operation (Correction Example 1 of Designated Area)

Figure 8:
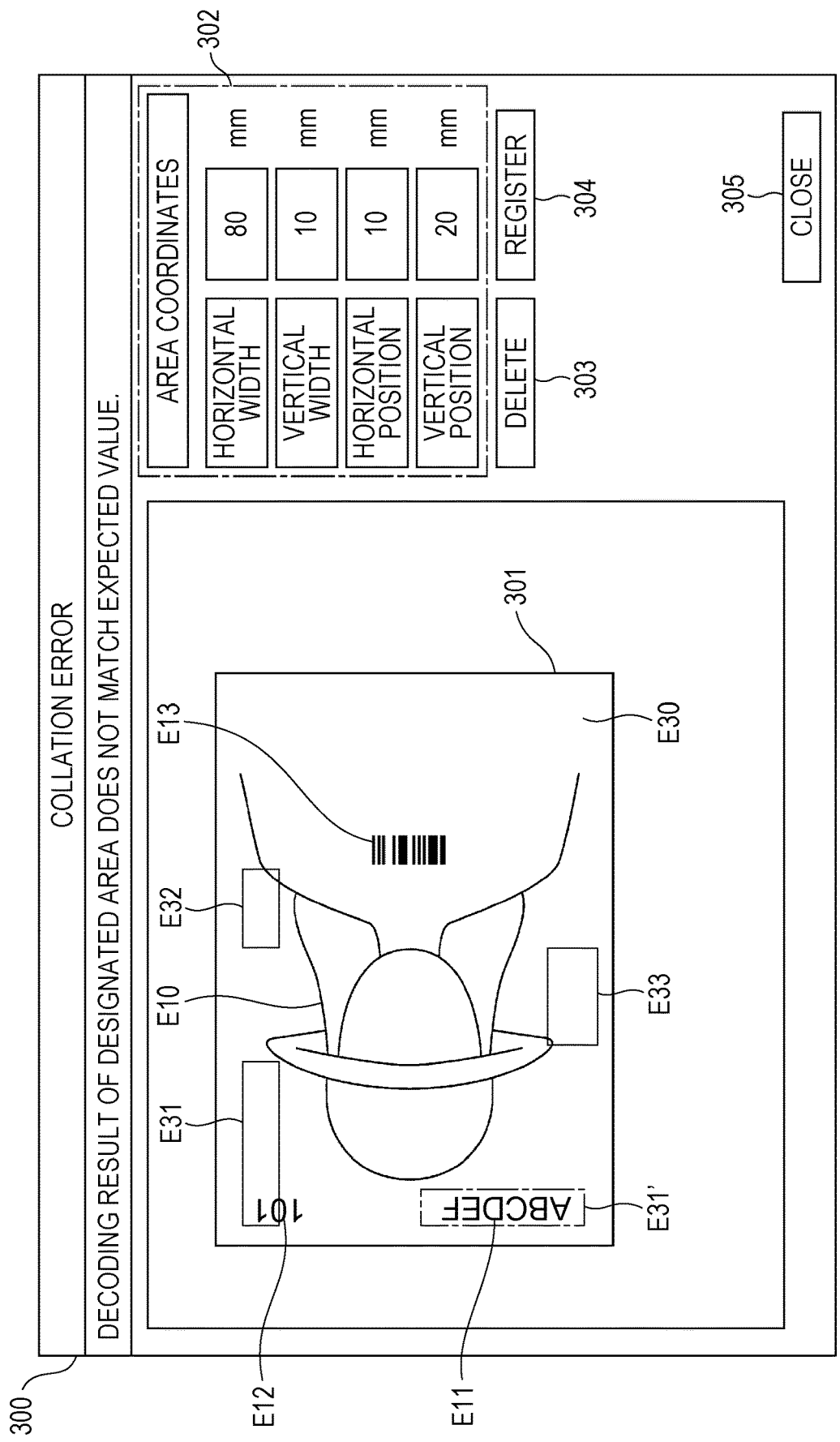
FIG. 8 is a diagram for describing Display Example 1 of a display operation screen in the first inspection operation in the image inspection processing according to the embodiment of the present invention.
Figure 9:
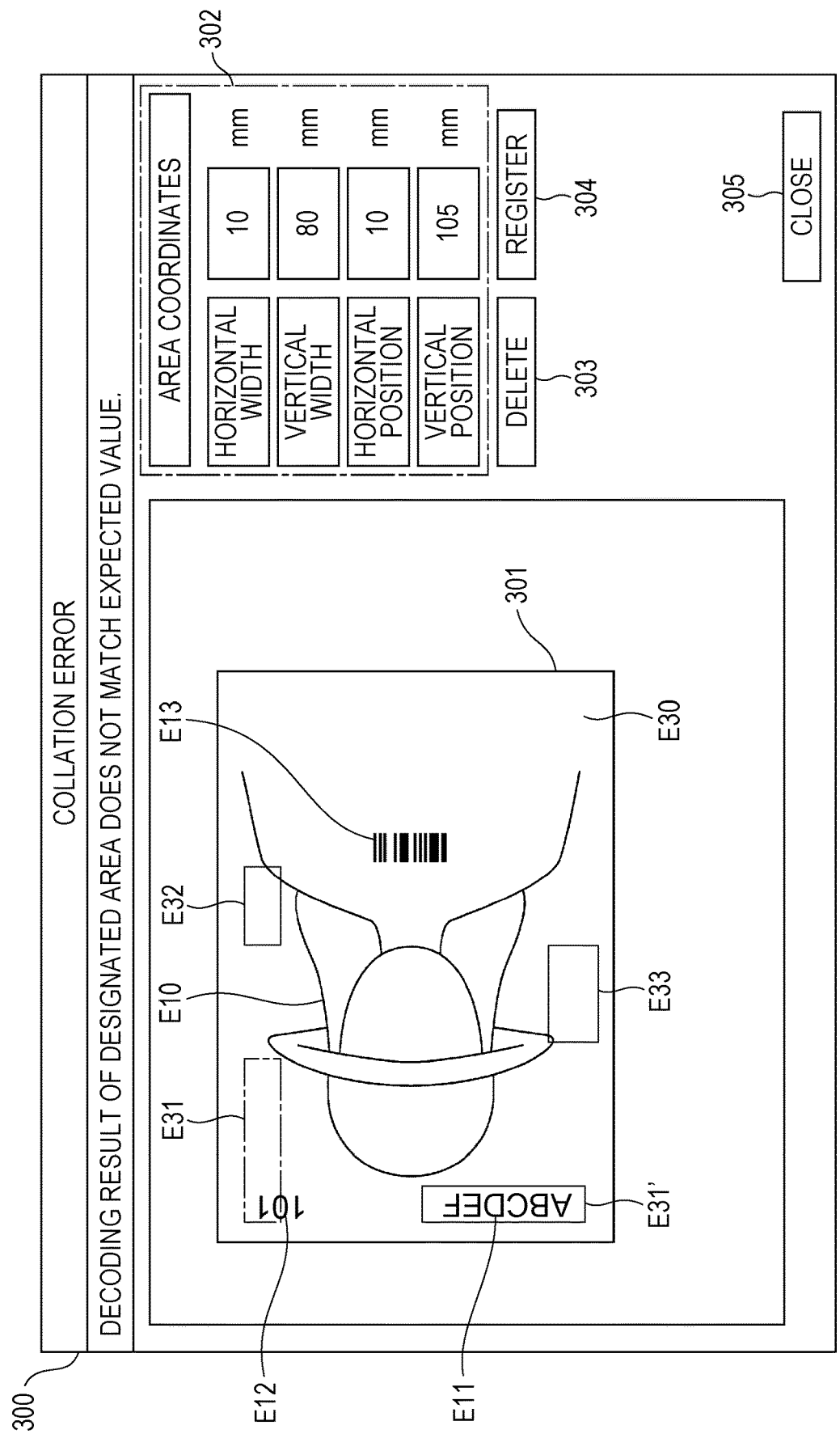
FIG. 9 is a diagram for describing Display Example 1 of the display operation screen in the first inspection operation in the image inspection processing according to the embodiment of the present invention.

FIGS. 8 and 9 are diagrams for describing Display Example 1 (Correction Example 1 of designated area) of a composite image displayed on the display operation screen of the operation display 14 when the first inspection operation is performed in the image inspection processing 2 (image inspection system 1) according to the present embodiment. FIG. 8 is a diagram illustrating a display mode of the display operation screen before correcting (changing) the data of the designated area (inspection target area and inspection exclusion area) for the original image, and FIG. 9 is a diagram illustrating a display mode of the display operation screen after correcting (changing) the data of the designated area for the original image.

A display operation screen 300 of this example displays, in an area from its central portion to the vicinity of the left end portion, a composite image 301 of a read image E30 of a recording medium on which an original image is printed and images E31, E32, and E33 of designated areas set for the original image in an external application. Note that in this example, the original image to be used is similar to the original image illustrated in FIG. 1. Hence, in FIGS. 8 and 9, areas of the person image, the character string image "ABCDEF", the numeral string image "101", and the barcode image in the read image E30 are also denoted by the same reference numerals as those in FIG. 1.

In this example, the designated area images E31, E32, and E33 displayed in the composite image 301 are formed by rectangular frame images. At this time, the size of the rectangular frame image indicating the designated area changes according to the size of the designated area. Note that while an example of forming the designated area image with a rectangular frame image will be described herein, the present invention is not limited to this example. An image in an arbitrary display form can be used as the designated area image as long as the range of the designated area can be visually recognized. For example, an elliptical frame image, a frame image in which corners of a rectangle are formed in an arc shape, or the like may be used as the designated area image, or an image which is a rectangular frame image and in which the inside of the frame is translucent may be used as the designated area image. The form of the designated area image can be appropriately set according to the print content in the designated area, for example, and an image having a circular shape or a polygonal shape other than a quadrangle may be used as the designated area image, for example.

In this example, on the display operation screen 300, various types of information regarding the coordinates of the designated areas displayed in the composite image 301 are displayed on the right side of the display area of the composite image 301. Specifically, a display area of "area coordinates 302" including the display of information (setting values in units of millimeters) of "horizontal width", "vertical width", "horizontal position", and "vertical position" of the designated area is provided. Note that in this example and Display Examples 2 and 3 described later, basically, the origin (reference position) serving as the reference of various types of information regarding the coordinates of each designated area is the vertex of the upper left corner of the composite image 301. The setting values of "horizontal position" and "vertical position" respectively correspond to coordinates in the horizontal direction (horizontal direction in FIGS. 8 and 9) and coordinates in the vertical direction (vertical direction in FIGS. 8 and 9) of the vertex of the upper left corner of the frame image of the designated area.

Then, in this example, the setting value regarding the coordinates displayed in each information area in the area coordinates 302 can be changed, for example, by the user performing a predetermined operation on the display operation screen 300 or an operation unit such as various buttons (see FIG. 3) provided on the operation device 142. Note that, as the predetermined operation by the user, any operation can be applied as long as it is an operation that can change each setting value in the area coordinates 302. Examples of the predetermined operation include a touch operation on the display operation screen 300 and a pressing operation on various buttons of the operation device 142. In a case where multiple designated areas are set as in this example, various types of information regarding the coordinates of the currently selected designated area are displayed in the area coordinates 302. Note that the designated area can be selected, for example, by the user touching (tapping) any one of the designated area images E31, E32, and E33 on the display operation screen 300.

In this example, on the display operation screen 300, images of a "delete" button 303 and a "register" button 304 that can be operated by a user's touch operation and are respectively operated when deleting (resetting) and registering information of the designated area are displayed below the area coordinates 302. In this example, on the display operation screen 300, a "close" button 305 that can be operated by a user's touch operation and is operated when the display operation screen 300 is closed is displayed below the display areas of the images of the "delete" button 303 and the "register" button 304.

Further, in this example, when the coordinate position of one or more designated areas with respect to the read image is not a desired position (expected value) (case of FIG. 8), information indicating occurrence of a collation error is displayed (notified) on an upper end portion of the display operation screen 300. In this example, words such as "collation error" and "specified decoding result does not match expected value" are displayed.

In Display Example 1 of a composite image in the first inspection operation (Correction Example 1 of designated area), a case will be described in which the orientation of a read image on a recording medium on which an original image is printed at the time of inspection (top-bottom direction: horizontal direction in example of FIG. 8) is rotated 270 degrees in the clockwise direction from the orientation of the original image when the designated area is set in the external application (orientation of original image displayed on setting screen: vertical direction in example of FIG. 8). Hence, in Display Example 1, as illustrated in FIG. 8, in the composite image 301 displayed on the display operation screen 300, the designated area images E31, E32, and E33 are displayed in positions rotated clockwise by 90 degrees from the desired positions (areas E11, E12, and E13).

When the user sees the composite image 301 displayed on the display operation screen 300, the user can easily confirm that the designated area images E31, E32, and E33 are not in the desired positions (areas E11, E12, and E13) and are set in wrong positions with respect to the read image. In such a case, in the present embodiment, the user can change the information regarding the coordinates of the designated area so that the position of the designated area is brought to a desired position on the display operation screen 300.

Specifically, the user can change (correct) the position of the designated area as follows. Note that, here, in order to simplify the description, a method of changing (correcting) the position of the designated area image E31 will be described. First, the user selects the designated area image E31 from the designated area images E31, E32, and E33 by a touch operation on the display 141 (area image selector), a pressing operation on various buttons on the operation device 142 (area image selector), or the like on the display operation screen 300. As a result, in the area of the setting values of "horizontal width", "vertical width", "horizontal position", and "vertical position" of the area coordinates 302, as illustrated in FIG. 8, "80", "10", "10", and "20" (mm) are respectively displayed as data (setting values) regarding the coordinates corresponding to the designated area image E31. Note that at this point, the data (setting value) when the designated area is set in the external application is displayed in the area of the area coordinates 302.

Next, the user sets a rectangular area E31' so that it surrounds the area 11 of the character string image ("ABCDEF") that is the desired position of the designated area image E31. Note that any method can be used as the method of setting the rectangular area E31'. For example, the rectangular area E31' may be set using an operation unit such as various buttons provided in the operation device 142 (area information changer), or may be set by the user directly touching the display operation screen 300 displayed on the display 141 (area information changer). As a result, as illustrated in FIG. 8, an image of the area E31' surrounding the character string image "ABCDEF" is displayed on the display operation screen 300. At this time, the image of the area E31' is displayed in a display form (frame image of one-dot chain line) different from that of the image E31. While the size of the area E31' is the same as the size of the image E31 in this example, the size of the area E31' may be different from the size of the image E31 as long as it is large enough to surround the character string image "ABCDEF".

Next, when the user presses the "register" button 304 (tap operation), the data regarding the coordinates of the designated area image E31 is rewritten to the data regarding the coordinates of the area E31', whereby the data of the designated area is corrected. At this time, as illustrated in FIG. 9, "10", "80", "10", and "105" (mm) are displayed in the areas of the setting values of "horizontal width", "vertical width", "horizontal position", and "vertical position" of the area coordinates 302 as data (setting values) regarding the coordinates corresponding to the area E31'. At this time, the image of the area E31' after correction changes from the frame image of the one-dot chain line to the frame image of a solid line, and the image E31 before correction changes from the frame image of the solid line to the frame image of the one-dot chain line. Note that, at this time, the image E31 before correction may be deleted.

Note that the method of changing (correcting) the data regarding the coordinates of the designated area image E31 is not limited to the above-described example. For example, a method may be used in which the user changes the setting values of "horizontal width", "vertical width", "horizontal position", and "vertical position" of the area coordinates 302 illustrated in FIG. 8 from "80", "10", "10", and "20" (mm) to "10", "80", "10", and "105" (mm) (coordinates of desired position (area E31')) using an operation unit such as various buttons provided on the operation device 142. Alternatively, for example, a method may be used in which, on the display operation screen 300, the user performs an operation such as a dragging operation while touching the designated area image E31 and moves the designated area image E31 to the desired position (area E31') and appropriately rotates the designated area image E31 to change (correct) the data regarding the coordinates of the designated area image E31.

Regarding the designated area images E32 and E33, the position of the designated area can be changed to a desired position in a similar manner as the above-described changing (correcting) method used for the designated area image E31. In this example, if there is a mistake in the correction operation of each designated area by the user, the "delete" button 303 can be pressed to reset the data regarding the coordinates of the designated area and display the data before correction in the area coordinates 302. At this time, in FIG. 8, the frame image of the one-dot chain line of the area E31' displayed on the display operation screen 300 also disappears.

In Display Example 1 of a composite image (Correction Example 1 of designated area), data regarding the coordinates of each designated area is changed (corrected) as described above. Note that the data regarding the coordinates of each designated area after correction is stored in the page memory 116b (page memo pm3), and at this time, the corresponding data regarding the coordinates of each designated area before correction is rewritten with the data regarding the coordinates of each designated area after correction. Data of the corrected composite image is stored in the page memory 116b (page memo pm2). At this time, too, the data of the composite image before correction is rewritten with the data of the composite image after correction.

Display Example 2 of Composite Image in First Inspection Operation (Correction Example 2 of Designated Area)

Figure 10:
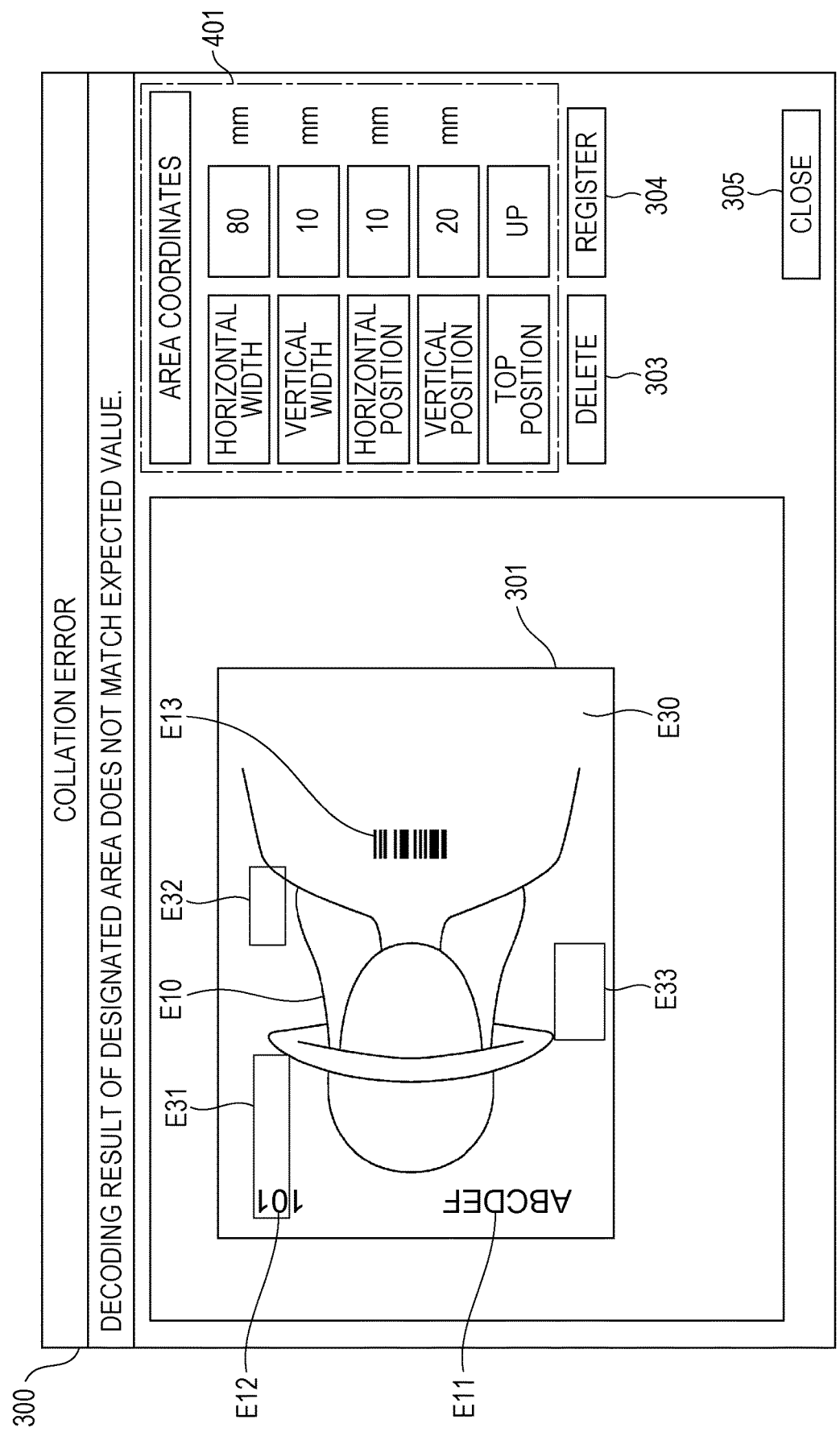
FIG. 10 is a diagram for describing Display Example 2 of the display operation screen in the first inspection operation in the image inspection processing according to the embodiment of the present invention.
Figure 11:
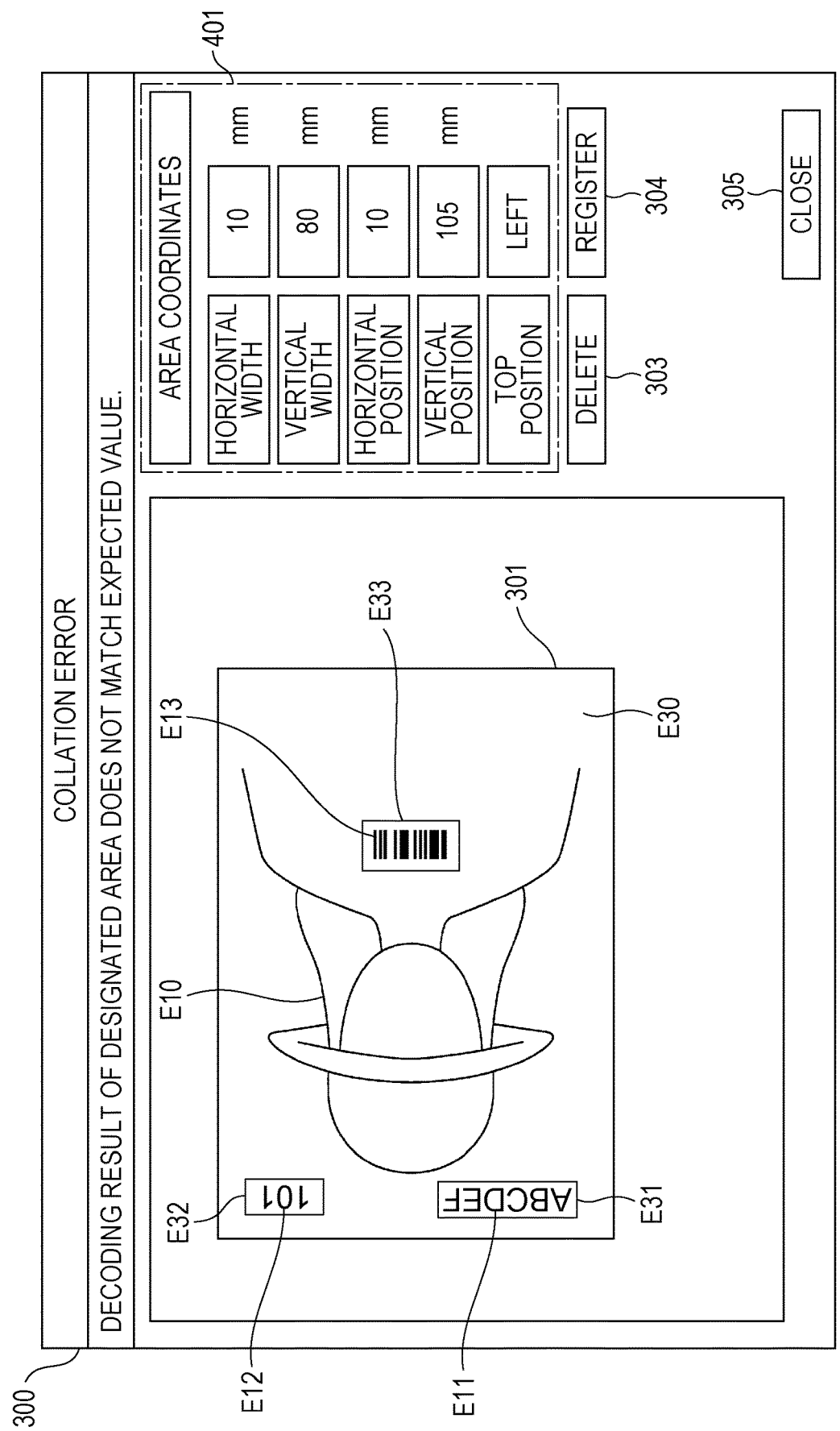
FIG. 11 is a diagram for describing Display Example 2 of the display operation screen in the first inspection operation in the image inspection processing according to the embodiment of the present invention.

FIGS. 10 and 11 are diagrams for describing Display Example 2 (Correction Example 2 of designated area) of a composite image displayed on the display operation screen of the operation display 14 when the first inspection operation is performed in the image inspection processing 2 (image inspection system 1) according to the present embodiment. FIG. 10 is a diagram illustrating a display mode of the display operation screen before correcting (changing) the data of the designated area (inspection target area and inspection exclusion area) for the original image, and FIG. 11 is a diagram illustrating a display mode of the display operation screen after correcting (changing) the data of the designated area for the original image.

Note that in the configuration of the read image, the designated area image, and the display operation screen of Display Example 2 illustrated in FIGS. 10 and 11, the same reference numerals are assigned to the same configurations as those of Display Example 1 illustrated in FIGS. 8 and 9. As is clear from the comparison between Display Example 2 illustrated in FIGS. 10 and 11 and Display Example 1 illustrated in FIGS. 8 and 9, in Display Example 2, only the configuration of area coordinates 401 (setting items of data regarding coordinates of designated area) is different from the configuration of the area coordinates 302 of Display Example 1, and other configurations of the read image, the designated area image, and the display operation screen are similar to those of Display Example 1. Hence, in order to simplify the description, the description of configurations other than the area coordinates 401, the read image, and the designated area image will be omitted.

In this example, in the display area of the area coordinates 401, in addition to the display area of the information (setting values in units of millimeters) of "horizontal width", "vertical width", "horizontal position", and "vertical position" of each designated area, a display area of information ("up", "down", "left", and "right") of the "top position" of the original image (original image in read image or original image when designated area is set) is further provided. Note that the "top position" mentioned here indicates the position of an edge side portion on the downstream side of a recording medium in the printing direction of the recording medium, and in this example, the edge side portion of the recording medium on the head side of the person image E10 in the original image is the top position. The information of the "top position" displayed on the display operation screen 300 can be changed in the same manner as the change of the information of the "horizontal width", the "vertical width", the "horizontal position", and the "vertical position" of each designated area described in Display Example 1.

Next, an operation of correcting data in the designated area in this example will be described. In this example, a case will be described in which the orientation of a read image on a recording medium on which an original image is printed at the time of inspection (top-bottom direction: horizontal direction in example of FIG. 10) is rotated by 270 degrees in the clockwise direction from the orientation of the original image when the designated area is set in the external application (orientation of original image displayed on setting screen: vertical direction in example of FIG. 10). Hence, in Display Example 2, as illustrated in FIG. 10, in the composite image 301 displayed on the display operation screen 300, the designated area images E31, E32, and E33 are displayed in positions rotated clockwise by 90 degrees from the desired positions (areas E11, E12, and E13). Hence, in this example, too, when the user sees the composite image 301 displayed on the display operation screen 300, the user can easily confirm that the designated area images E31, E32, and E33 are not in the desired positions (areas E11, E12, and E13) and are set in wrong positions with respect to the read image.

In the correction operation of this example, first, the user selects the designated area image E31 from the images E31, E32, and E33 by a touch operation on the display 141 (area image selector), a pressing operation on various buttons on the operation device 142 (area image selector), or the like on the display operation screen 300. As a result, in the area of the setting values of "horizontal width", "vertical width", "horizontal position", and "vertical position" of the area coordinates 401, as illustrated in FIG. 10, "80", "10", "10", and "20" (mm) are respectively displayed as data (setting values) regarding the coordinates corresponding to the designated area image E31. At this point, since the data regarding the designated area set in the application is displayed in the area coordinates 401, the orientation (vertical direction in this example) of the original image when the designated area is set in the application is the top-bottom direction, and "up" is displayed in the information area of "top position". From this information, the user can recognize that the top position (upper side) of the original image when the designated area is set in the external application does not match the top position (left) of the read image.

Accordingly, in order to correct the designated area image E31 to a desired position (position surrounding area 11 of the character string image "ABCDEF"), the user changes the information of the "top position" to the "left" using an operation unit such as various buttons provided on the operation device 142 (top position changer), and presses the "register" button 304 (tap operation). With this operation, on the display operation screen 300, all the designated area images E31, E32, and E33 are rotated 270 degrees in the clockwise direction. As a result, as illustrated in FIG. 11, the designated area images E31, E32, and E33 move to desired positions (positions of areas E11, E12, and E13) on the composite image 301, and data regarding the coordinates of the designated area images E31, E32, and E33 are changed. At this time, in the area of the setting values of "horizontal width", "vertical width", "horizontal position", and "vertical position" of the area coordinates 401, as illustrated in FIG. 11, "10", "80", "10", and "105" (mm) are respectively displayed as data (setting values) regarding the coordinates corresponding to the designated area image E31 after the change.

Note that while an example has been described in which the "top position" is changed to change the data of the designated area in a state where the image E31 of the designated area is selected, the present invention is not limited to this example, and the "top position" may be changed to change the data of the designated area in a state where the designated area image E32 or E33 is selected. In this case, too, each designated area can be arranged in a desired position by executing the above-described changing method (method of changing information of "top position").

Display Example 3 of Composite Image in First Inspection Operation (Correction Example 3 of Designated Area)

Figure 12:
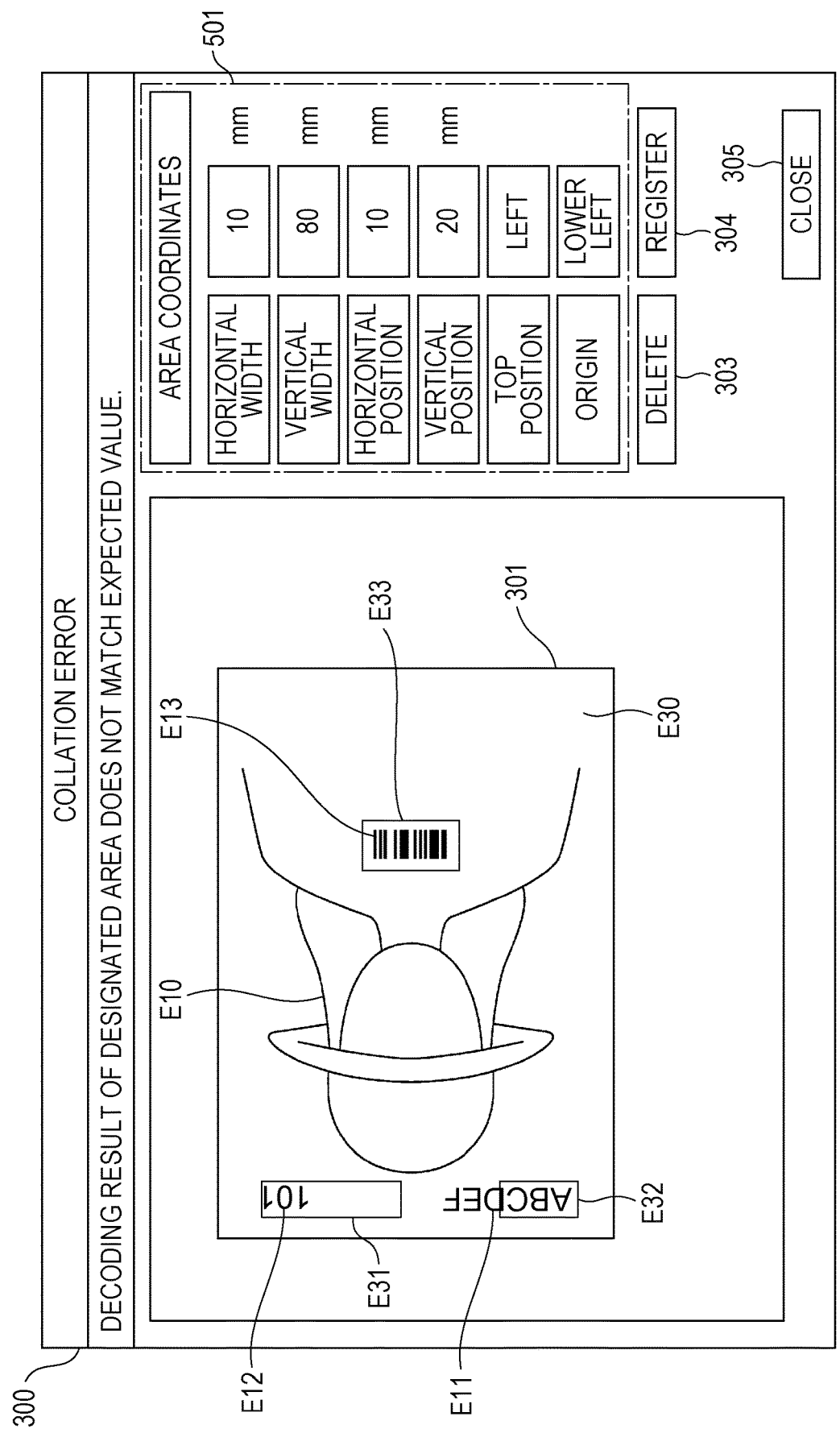
FIG. 12 is a diagram for describing Display Example 3 of the display operation screen in the first inspection operation in the image inspection processing according to the embodiment of the present invention.
Figure 13:
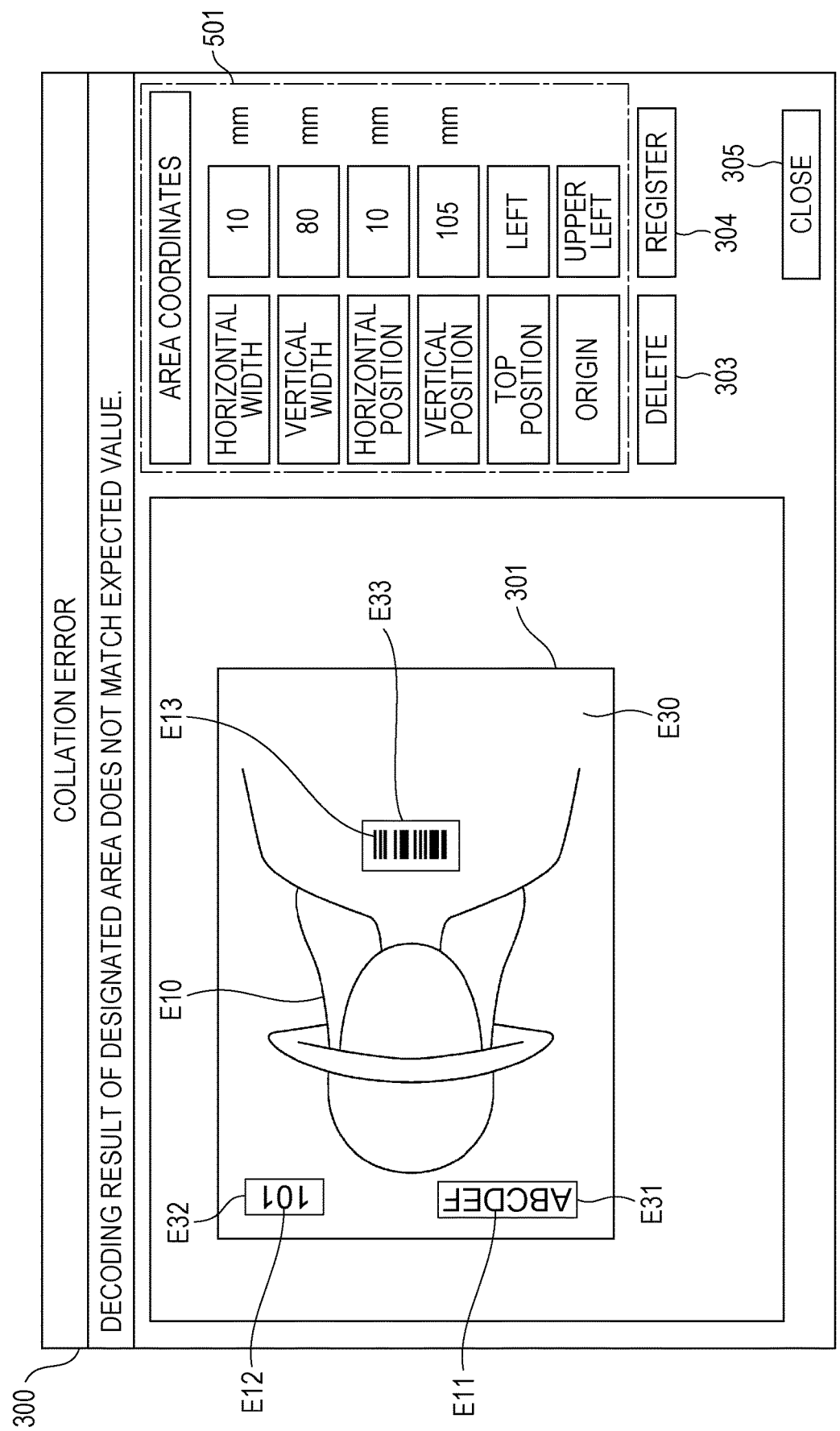
FIG. 13 is a diagram for describing Display Example 3 of the display operation screen in the first inspection operation in the image inspection processing according to the embodiment of the present invention.

FIGS. 12 and 13 are diagrams for describing Display Example 3 (Correction Example 3 of designated area) of a composite image displayed on the display operation screen of the operation display 14 when the first inspection operation is performed in the image inspection processing 2 (image inspection system 1) according to the present embodiment. FIG. 12 is a diagram illustrating a display mode of the display operation screen before correcting (changing) the data of the designated area (inspection target area and inspection exclusion area) for the original image, and FIG. 13 is a diagram illustrating a display mode of the display operation screen after correcting (changing) the data of the designated area for the original image.

Note that in the configuration of the read image, the designated area image, and the display operation screen of Display Example 3 illustrated in FIGS. 12 and 13, the same reference numerals are assigned to the same configurations as those of Display Example 2 illustrated in FIGS. 10 and 11. As is clear from the comparison between Display Example 3 illustrated in FIGS. 12 and 13 and Display Example 2 illustrated in FIGS. 10 and 11, in Display Example 3, only the configuration of area coordinates 501 (setting items of data regarding coordinates of designated area) is different from the configuration of the area coordinates 401 of Display Example 2, and other configurations of the read image, the designated area image, and the display operation screen are similar to those of Display Example 2. Hence, in order to simplify the description, the description of configurations other than the area coordinates 501, the read image, and the designated area image will be omitted.

In this example, in the display area of the area coordinates 501, in addition to the display area of the information (setting values in units of millimeters) of "horizontal width", "vertical width", "horizontal position", and "vertical position" of each designated area and the information of the "top position" ("up", "down", "left", and "right"), a display area of information of the "origin (reference position)" (corner vertices of "upper left", "lower left", "upper right", and "lower right") of the original image (original image in read image or original image when designated area is set) is further provided. Note that the information of the "origin" displayed on the display operation screen 300 can also be changed in the same manner as the change of the information of the "horizontal width", the "vertical width", the "horizontal position", the "vertical position", and the "top position" of each designated area described in Display Examples 1 and 2.

Next, an operation of correcting data in the designated area in this example will be described. In this example, a case will be described in which the orientation of a read image on a recording medium on which an original image is printed at the time of inspection (top-bottom direction: horizontal direction in example of FIG. 12) is the same as the orientation of the original image when the designated area is set in the external application (orientation of original image displayed on setting screen: horizontal direction in example of FIG. 12). Note, however, that in this example, a case will be described in which the origin position of the read image is "upper left", but the origin position of the original image when the designated area is set in the external application is "lower left" (example including different origin positions). Hence, in Display Example 3, as illustrated in FIG. 12, in the composite image 301 displayed on the display operation screen 300, the designated area images E31, E32, and E33 are displayed in positions vertically inverted with respect to the desired position (areas E11, E12 and E13). Hence, in this example, too, when the user sees the composite image 301 displayed on the display operation screen 300, the user can easily confirm that the designated area images E31 and E32 are not in the desired positions (areas E11 and E12) and are set in wrong positions with respect to the read image.

In the correction operation of this example, first, the user selects the designated area image E31 from the images E31, E32, and E33 by a touch operation on the display 141 (area image selector), a pressing operation on various buttons on the operation device 142 (area image selector), or the like on the display operation screen 300. As a result, in the area of the setting values of "horizontal width", "vertical width", "horizontal position", and "vertical position" of the area coordinates 501, as illustrated in FIG. 12, "10", "80", "10", and "20" (mm) are respectively displayed as data (setting values) regarding the coordinates corresponding to the designated area image E31, and "left" which is the top position of the original image when the designated area is set in the application is displayed as information of the "top position". At this point, "lower left" which is the origin position of the original image when the designated area is set in the application is displayed in the information area of "origin". From this information, the user can recognize that the original position ("lower left") of the original image when the designated area is set in the external application does not match the original position ("upper left") of the read image.

Accordingly, in order to correct the designated area image E31 to a desired position (position surrounding area 11 of character string image "ABCDEF"), the user changes the information of the "origin" to "upper left" using an operation unit such as various buttons provided on the operation device 142 (reference position changer), and presses the "register" button 304 (tap operation). With this operation, the arrangement positions of the designated area images E31, E32, and E33 are reversed in the vertical direction on the display operation screen 300. As a result, as illustrated in FIG. 13, the designated area images E31, E32, and E33 move to desired positions (positions of areas E11, E12, and E13) on the composite image 301, and data regarding the coordinates of the designated area images E31, E32, and E33 are changed. At this time, in the area of the setting values of "horizontal width", "vertical width", "horizontal position", and "vertical position" of the area coordinates 501, as illustrated in FIG. 13, "10", "80", "10", and "105" (mm) are respectively displayed as data (setting values) regarding the coordinates corresponding to the designated area image E31 after the change.

Note that while an example in which both the "top position" and the "origin" can be set has been described in Display Example 3 illustrated in FIGS. 12 and 13, the present invention is not limited to this example. In Display Example 3, the "top position" setting function may be omitted.

[Effect]

As described above, in the first inspection operation (checking operation) of a designated area for an original image performed at the time of execution of proof mode printing (trial printing) in the image inspection apparatus 2 (image inspection system 1) of the present embodiment, the designated area to be inspected and/or excluded from inspection is set for the original image by the external PC 50 and/or the application installed in the image inspection apparatus 2. Hence, the need to set a designated area for a read image of proof mode printing is eliminated, so that complication of setting of the designated area can be prevented. Since the designated area can be designated with the application at the time of generating the original image, operations to be performed on various images to be printed can be concentrated in one place.

In the first inspection operation (checking operation) of a designated area described above, a composite image of the read image of the original image printed in proof mode printing (trial printing) and the designated area image set in the external application is displayed on the display operation screen 300. Hence, the user can easily confirm whether the designated area is arranged in a desired position on the display operation screen 300. In the first inspection operation (checking operation) of a designated area described above, if the user sees the display result of the composite image and determines that the designated area is not arranged in a desired position, it is possible to change (correct) various data regarding the coordinates of the designated area so that the designated area is arranged in a desired position on the display operation screen 300. Further, in the first inspection operation (checking operation) of a designated area described above, if the user sees the display result of the composite image and determines that the designated area is arranged in a desired position, final printing can be executed immediately, and deterioration in productivity can be curbed.

That is, in the image inspection apparatus 2 (image inspection system 1) of the present embodiment, by performing the first inspection operation (checking operation) of a designated area described above at the time of executing proof mode printing (trial printing), the designated area can be easily set, checked, and changed (corrected), and deterioration in productivity can be curbed as well.

[Second Inspection Operation (Second Designated Area Checking Function)]

Next, a second inspection operation (checking operation) of a designated area for an original image performed at the time of execution of proof mode printing (trial printing) in the image inspection apparatus 2 (image inspection system 1) of the present embodiment will be described. In the second inspection operation (checking operation) of a designated area, first, a composite image of an image of a designated area (inspection target area and inspection exclusion area) set for an original image on the external PC 50 or an application loaded (installed) in the image inspection apparatus 2 and the original image is generated, and the composite image is printed on a recording medium. Then, in the printed recording medium, the user checks the positional relationship between the original image and the designated area, determines whether the position of the designated area is correct (correctness confirmation), and corrects the designated area as necessary.

Figure 14:
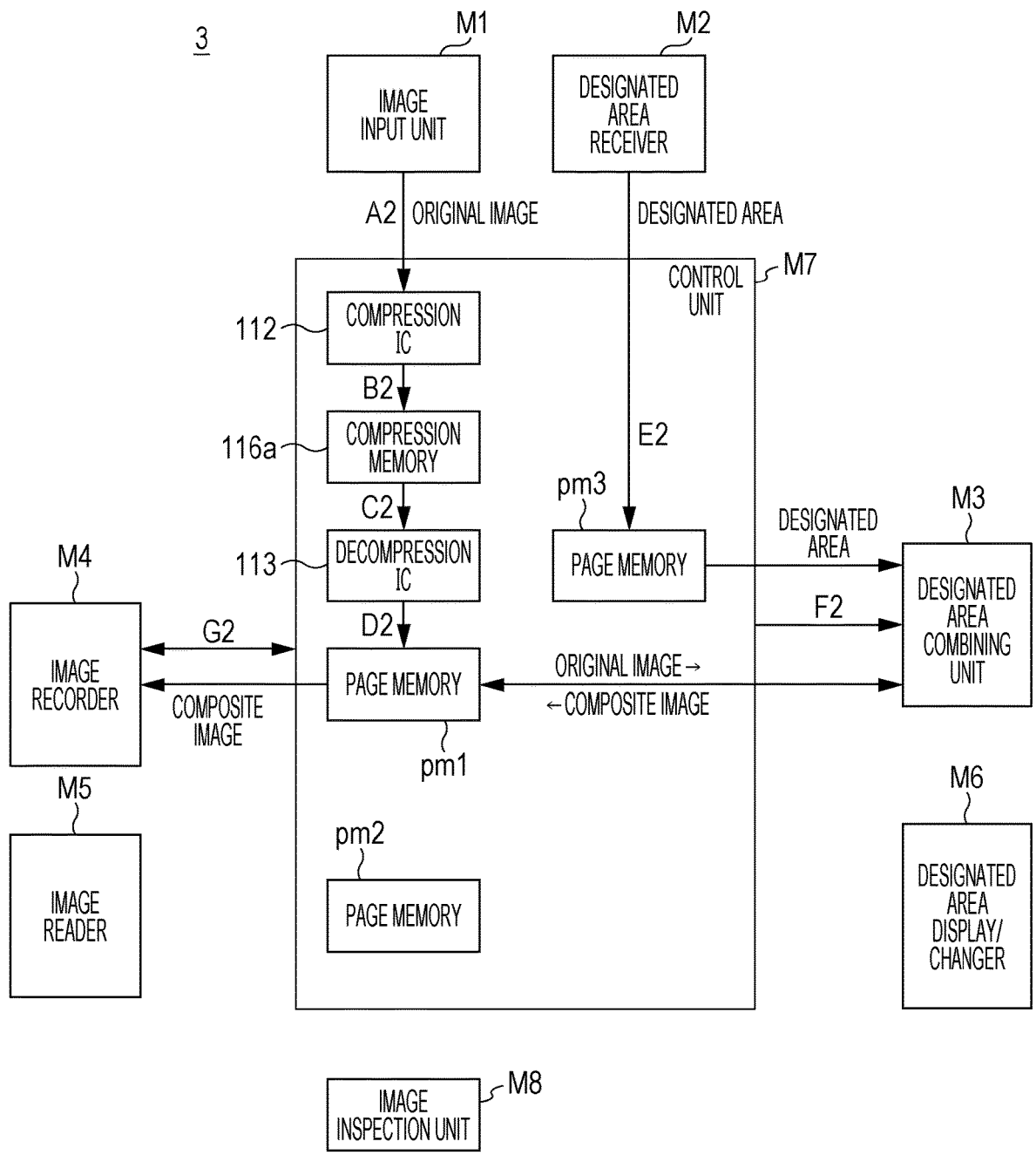
FIG. 14 is a diagram illustrating the flow of data and instruction signals among functional blocks in a second inspection operation in the image inspection apparatus according to the embodiment of the present invention.

FIG. 14 is a diagram illustrating the flow of data and instruction signals among functional blocks in the second inspection operation (checking operation) of a designated area for an original image Note that the functional blocks illustrated in FIG. 14 are similar to the functional blocks described in FIG. 5, and are therefore denoted by the same reference numerals.

In the second inspection operation (checking operation) of a designated area, as illustrated in FIG. 14, the control unit M7 first receives an original image from the image input unit M1 (image processor 60) (operation A2). Next, the control unit M7 (compression IC 112) compresses the received original image and stores the compressed image in the compression memory 116*a* (operation B2). Next, the control unit M7 (decompression IC 113) decompresses the compressed original image stored in the compression memory 116*a* and stores the decompressed image in the page memory pm1 (operations C2 and D2).

In the second inspection operation (checking operation) of a designated area, the control unit M7 receives data (including coordinate data and the like) of the designated area for the original image from the image input unit M1 (image processor 60), and stores the received data of the designated area in the page memory pm3 (operation E2). Note that the operation from the reception of the data of the designated area to the storage thereof in the page memory pm3 indicated by the operation E2 may be performed in parallel with the operation from the reception of the data of the original image to the storage thereof in the page memory pm1 indicated by the operations A2 to D2, or the operation E2 may be performed after or before the operations A2 to D2.

Next, in the second inspection operation (checking operation) of a designated area, the control unit M7 issues an instruction to combine the designated area image and the original image to the designated area combining unit M3 (operation F2). At this time, the control unit M7 generates data of the received designated area image and stores the data in the page memory pm3. Next, the designated area combining unit M3 acquires the original image stored in the page memory pm1 and the designated area image corresponding to the original image stored in the page memory pm3, and generates a composite image of the designated area image and the original image. Then, data of the generated composite image of the designated area image and the original image is output to the page memory pm1 and stored. Note that since the designated area image is generated on the basis of the data of the designated area set in the application, the position where the designated area image is formed is determined by the data of the designated area, and is not affected by the orientation (top-bottom direction), positional deviation, or the like of the original image at the time of image formation. Hence, as described in FIGS. 2A and 2B, for example, in a case where the orientation of the original image is rotated 270 degrees in the clockwise direction from the desired orientation at the time of image formation, the formation position of the designated area image on the recording medium is a position rotated 90 degrees in the clockwise direction from the desired position with respect to the original image.

Next, in the second inspection operation (checking operation) of a designated area, after the data of the composite image of the designated area image and the original image is stored in the page memory pm1, the control unit M7 issues a print instruction of the original image to the image recorder M4 (printer 12) (operation G2). At this time, the control unit M7 outputs the data of the composite image of the designated area image and the original image to the image recorder M4 (printer 12). Then, upon completion of the printing of the composite image, the image recorder M4 (printer 12) notifies the control unit M7 of the completion of printing (operation G2).

[Image Inspection Processing Including Second Inspection Operation]

Figure 15:
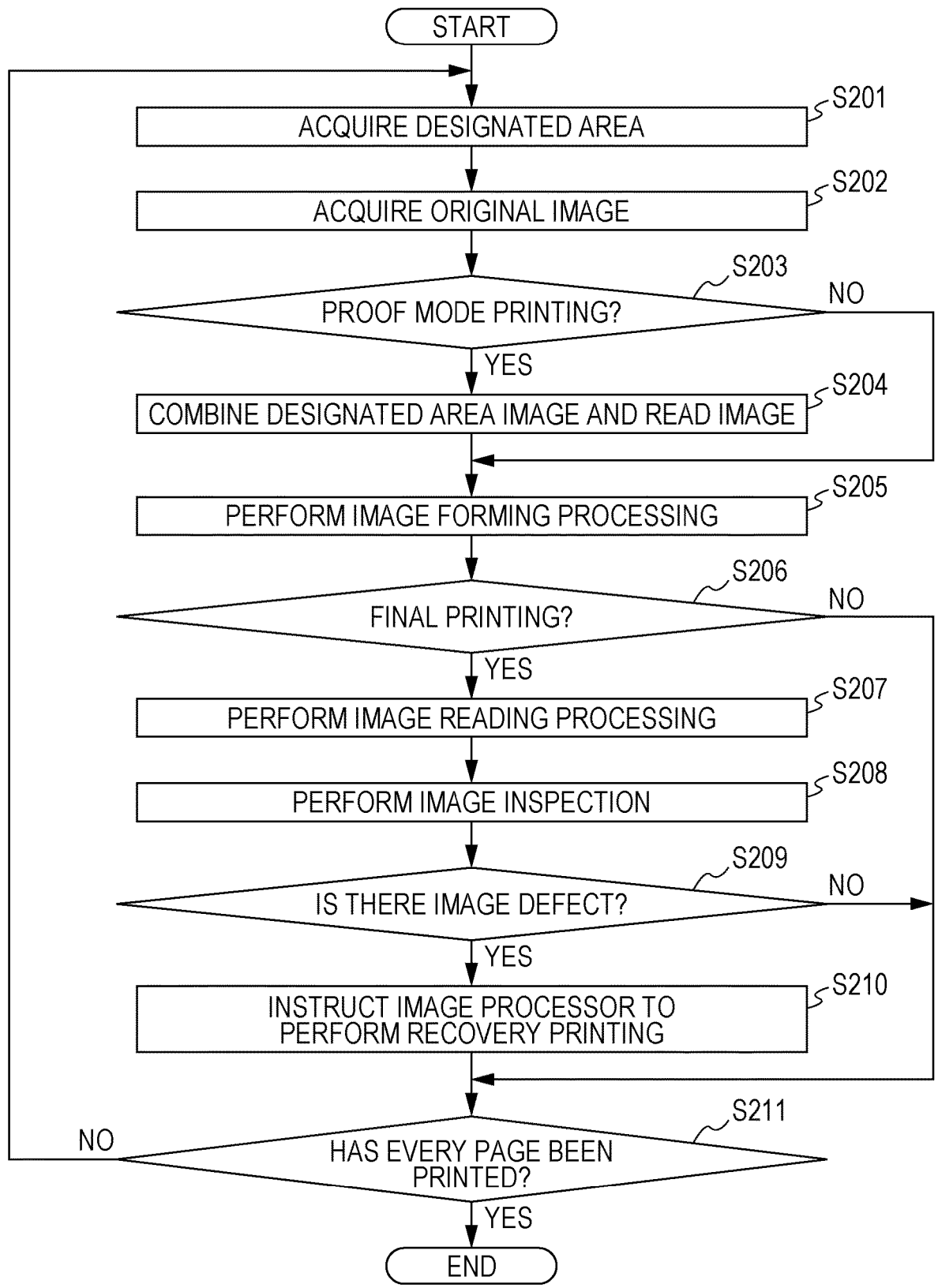
FIG. 15 is a flowchart illustrating a procedure of image inspection processing in the second inspection operation in the image inspection processing according to the embodiment of the present invention.

Next, a procedure of image inspection processing (image forming processing) including a second inspection operation performed by the image inspection apparatus 2 (image inspection system 1) of the present embodiment will be described. FIG. 15 is a flowchart illustrating a procedure of image inspection processing (image forming processing) including the second inspection operation performed in the present embodiment.

In the image inspection apparatus 2, when the image processor 60 receives data of a print job from the external PC 50 through the communication network 40, image inspection processing is started.

First, the controller 11 acquires data (coordinate data and the like) of a designated area (inspection target area and inspection exclusion area) set for an original image (step S201). In the processing, the controller 11 acquires data of the designated area set for the original image on the external PC 50 or the application installed in the image inspection apparatus 2. The acquired data of the designated area is stored in the page memory 116b of the image memory 116.

Next, the controller 11 acquires data of the original image (step S202). In the processing, the controller 11 compresses the data of the original image included in data of a print job received from the image processor 60 and stores the data in the compression memory 116a, and decompresses the compressed original image stored in the compression memory 116a and stores the image in the page memory 116b.

Next, the controller 11 determines whether the executed printing is proof mode printing (trial printing) (step S203).

In the processing of step S203, if the controller 11 determines that the executed printing is not proof mode printing (NO in step S203), the controller 11 performs the processing of step S205 described later.

On the other hand, in the processing of step S203, if the controller 11 determines that the executed printing is proof mode printing (YES in step S203), the controller 11 combines the designated area image and the original image to generate a composite image (step S204). In the processing, the controller 11 generates a designated area image (e.g., rectangular frame image to be described later) on the basis of the data of the designated area acquired in the process of step S201, and combines the generated designated area image and the original image obtained in the processing of step S202 to generate a composite image. Data of the generated composite image is stored in the page memory 116b of the image memory 116. Note that the designated area image may be generated when the data of the designated area is acquired in the processing of S201.

After the processing in step S204 or if the determination in step S203 is NO, the controller 11 performs image forming processing (step S205). In the processing, when the executed printing is proof mode printing, the controller 11 outputs the data of the composite image generated in the processing of step S204 to the printer 12, and issues a print instruction of the composite image to the printer 12. Upon receipt of the print instruction from the controller 11, the printer 12 prints the composite image input from the controller 11 on a recording medium supplied by a recording medium supply device (not illustrated) of the printing device 121. In the processing, when the executed printing is final printing, the controller 11 outputs the data of the original image acquired in the processing of step S202 to the printer 12 and issues a print instruction of the original image to the printer 12. Upon receipt of the print instruction from the controller 11, the printer 12 prints the original image input from the controller 11 on a recording medium supplied by a recording medium supply device (not illustrated) of the printing device 121. Then, the recording medium on which the composite image or the original image is printed is ejected to the image reader 20. Upon completion of the printing, the printer 12 notifies the controller 11 of the completion.

Next, the controller 11 determines whether the printing executed in step S205 is final printing (step S206).

In the processing of step S206, if the controller 11 determines that the executed printing is not final printing (NO in step S206), the controller 11 performs the processing of step S211 described later.

On the other hand, in the processing of step S206, if the controller 11 determines that the executed printing is final printing (YES in step S206), the controller 11 performs image reading processing (step S207). In the processing, first, the controller 11 issues an instruction to read the image printed on the recording medium to the image reader 20. Upon receipt of the image reading instruction from the controller 11, the image reader 20 reads the image printed on the recording medium ejected to the image reader 20. Then, the controller 11 acquires the image (read image) read by the image reader 20 and stores the image in the page memory 116b of the image memory 116.

Next, the controller 11 performs image inspection of the recording medium on which the image is formed (step S208). In the processing, the controller 11 performs collation processing between the read image obtained in step S207 and a reference image prepared in advance, and inspects whether there is a defect in the read image. In a case where a designated area is set for the original image, in the image inspection processing of step S208, the controller 11 performs inspection processing or inspection exclusion processing according to the type of each designated area.

Next, based on the result of the image inspection of step S208, the controller 11 determines whether there is an image defect (step S209).

In the processing of step S209, if the controller 11 determines that there is no image defect (NO in step S209), the controller 11 performs the processing of step S211 described later.

On the other hand, in the processing of step S209, if the controller 11 determines that there is an image defect (YES in step S209), the controller 11 issues a recovery printing instruction to the image processor 60 (step S210).

After the processing of step S210, if it is determined NO in the processing of step S206 or NO in the processing of step S209, the controller 11 determines whether printing has been completed for every page (step S211).

In the processing of step S211, if the controller 11 determines that printing has not been completed for every page of the original image (NO in step S211), the controller 11 returns to the processing of step S201 and repeats the processing of steps S201 to S211.

On the other hand, in the processing of step S211, if the controller 11 determines that printing has been completed for every page of the original image (YES in step S211), the controller 11 ends the image inspection processing.

Print Example 1 of Composite Image in Second Inspection Operation (Confirmation Example 1 of Designated Area)

Figure 16:
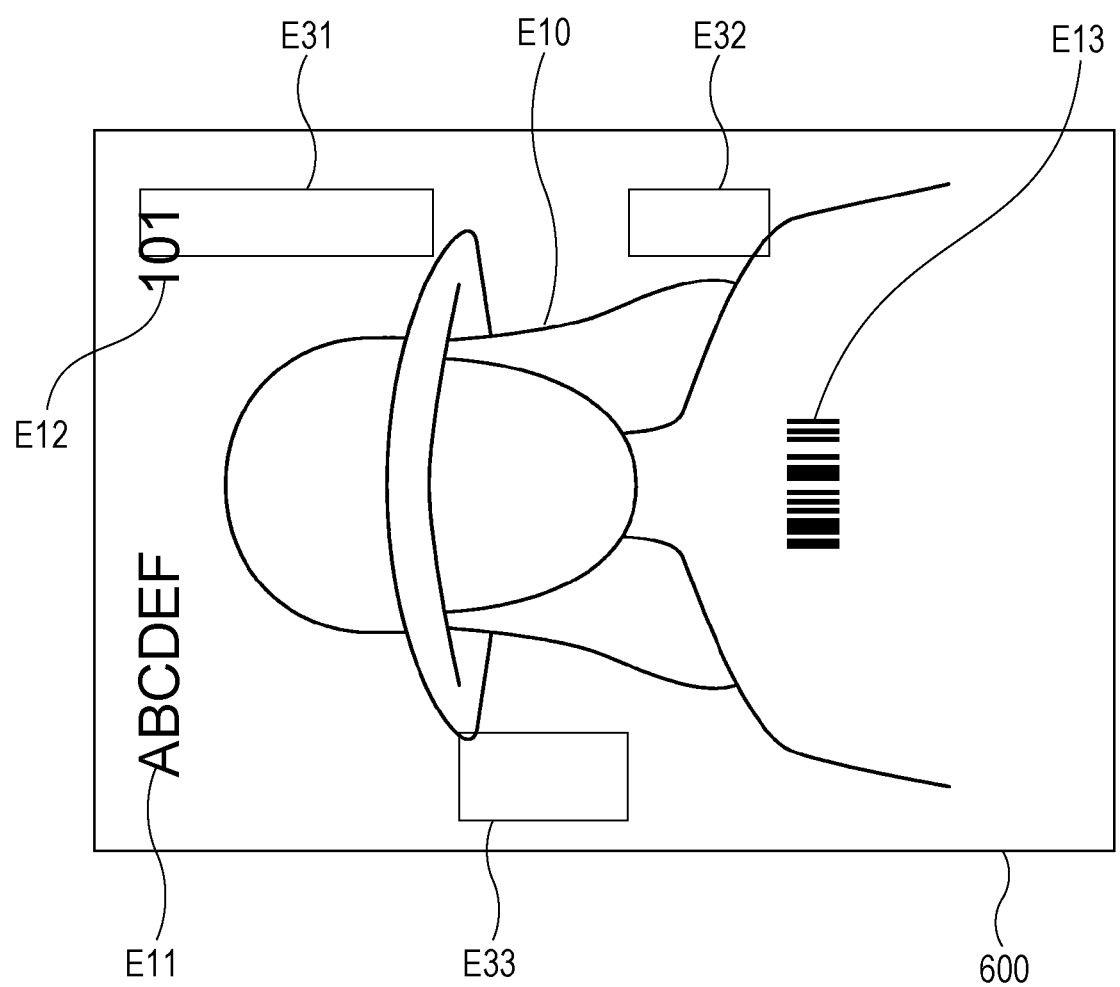
FIG. 16 is a diagram for describing Print Example 1 of a composite image printed on a recording medium in the second inspection operation in the image inspection processing according to the embodiment of the present invention.

FIG. 16 is a diagram illustrating Print Example 1 of a composite image printed on a recording medium in the second inspection operation of the image inspection processing 2 (image inspection system 1) according to the present embodiment.

In Print Example 1 of a composite image (Confirmation Example 1 of designated area) illustrated in FIG. 16, the original image to be used is the same as the original image illustrated in FIG. 1. In this example, the configuration of the designated area (number, arrangement position, and the like) and the designated area image printed on a recording medium 600 are also the same as the designated area image (rectangular frame image) illustrated in FIG. 8. Hence, in FIG. 16, a person image, a character string image "ABCDEF", a numerical string image "101", a barcode image, and multiple designated area images printed on the recording medium 600 are denoted by the same reference numerals as those in Display Example 1 illustrated in FIG. 8.

In Print Example 1 of a composite image (Confirmation Example 1 of designated area) illustrated in FIG. 16, a case will be described in which the orientation of a composite image of the original image and the designated area image when the composite image is printed at the time of inspection (top-bottom direction: horizontal direction in example of FIG. 16) is rotated by 270 degrees in the clockwise direction from the orientation of the original image when the designated area is set in the external application (orientation of original image displayed on setting screen: vertical direction in example of FIG. 16).

In this example, since the orientation of the composite image at the time of printing the composite image is rotated by 270 degrees in the clockwise direction with respect to the orientation of the original image at the time of setting the designated area, in the composite image printed on the recording medium 600, the designated area images E31, E32, and E33 are printed in positions rotated by 90 degrees in the clockwise direction from desired positions (areas E11, E12, and E13).

Hence, when the user sees the print result of the composite image as illustrated in FIG. 16, the user can easily confirm that the designated area images E31, E32, and E33 are not in the desired positions (areas E11, E12, and E13) and are set in wrong positions with respect to the original image. In such a case, the user resets various data regarding the coordinates of the designated area on the external PC 50 or the application installed in the image inspection apparatus 2, so that the designated area images E31, E32, and E33 are arranged in the desired positions (areas E11, E12, and E13).

Print Example 2 of Composite Image in Second Inspection Operation (Confirmation Example 2 of Designated Area)

For example, in a case where the size of the original image is different from the size of the recording medium (printing paper), or in a case where the original image is shifted and printed, the origin of the original image is different from the origin of the recording medium (printing paper) even if the orientation of the original image when the designated area is set in the external application is the same as the orientation of the composite image (recording medium) at the time of printing. Here, a printing example of a composite image in such a case will be described.

Figure 17:
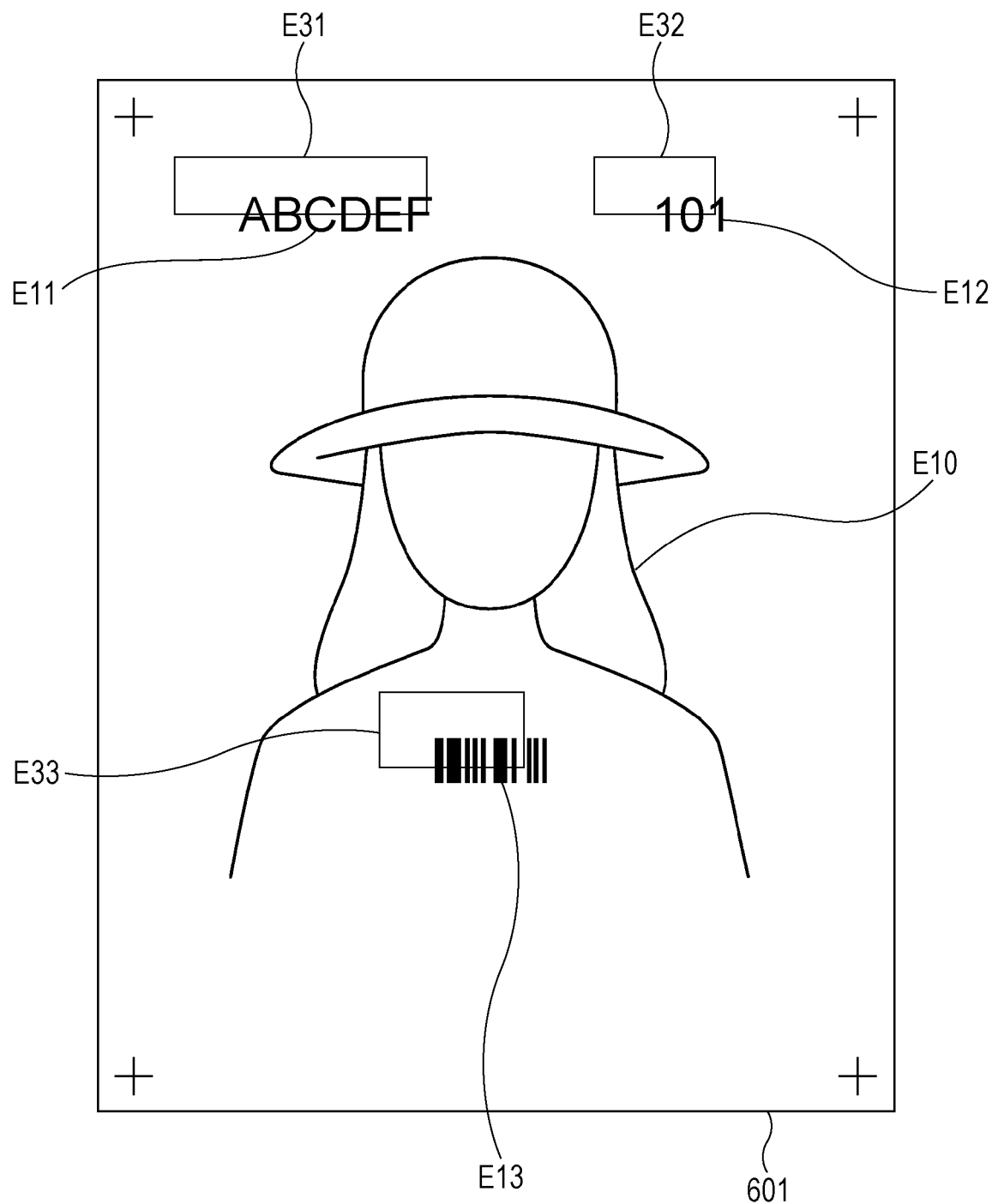
FIG. 17 is a diagram for describing Print Example 2 of a composite image printed on a recording medium in the second inspection operation in the image inspection processing according to the embodiment of the present invention.

FIG. 17 is a diagram illustrating Print Example 2 of a composite image printed on a recording medium in the second inspection operation of the image inspection processing 2 (image inspection system 1) according to the present embodiment.

Note that the example illustrated in FIG. 17 is a printing example of a composite image in a case where the orientation of the original image when the designated area is set in the external application is the same as the orientation of the composite image (recording medium) at the time of printing, but the size of a recording medium (printing paper) 601 is larger than the size of the original image. In FIG. 17, the size of the original image is the size of an area inside a boundary defined by cross marks (so-called trim marks) printed in the vicinity of each corner of the recording medium 601.

In Print Example 2 of a composite image (Confirmation Example 2 of designated area) illustrated in FIG. 17, the original image to be used is the same as the original image illustrated in FIG. 1. In this example, the configuration of the designated area (number, arrangement position, and the like) and the designated area image printed on a recording medium 601 are also the same as the designated area image (rectangular frame image) illustrated in FIG. 8. Hence, in FIG. 17, a person image, a character string image "ABCDEF", a numerical string image "101", a barcode image, and multiple designated area images printed on the recording medium 601 are denoted by the same reference numerals as those in Display Example 1 illustrated in FIG. 8.

In this example, the origin of the recording medium 601 (printing paper) is the vertex of the upper left corner of the recording medium 601, while the origin of the original image on the recording medium 601 is the center of the upper left cross mark. In this case, since the set coordinates of each designated area at the time of printing are coordinates with respect to the origin of the recording medium 601 (printing paper), in the print result of this example, the designated area images E31, E32, and E33 are printed in positions shifted in the upper left direction from the desired position (areas E11, E12, and E13) as illustrated in FIG. 17.

Hence, in this example, too, when the user sees the print result of the composite image as illustrated in FIG. 17, the user can easily confirm that the designated area images E31, E32, and E33 are not in the desired positions (areas E11, E12, and E13) and are set in wrong positions with respect to the original image. In such a case, the user resets various data regarding the coordinates of the designated area on the external PC 50 or the application installed in the image inspection apparatus 2, so that the designated area images E31, E32, and E33 are arranged in the desired positions (areas E11, E12, and E13).

Print Example 3 of Composite Image in Second Inspection Operation (Confirmation Example 3 of Designated Area)

Figure 18:
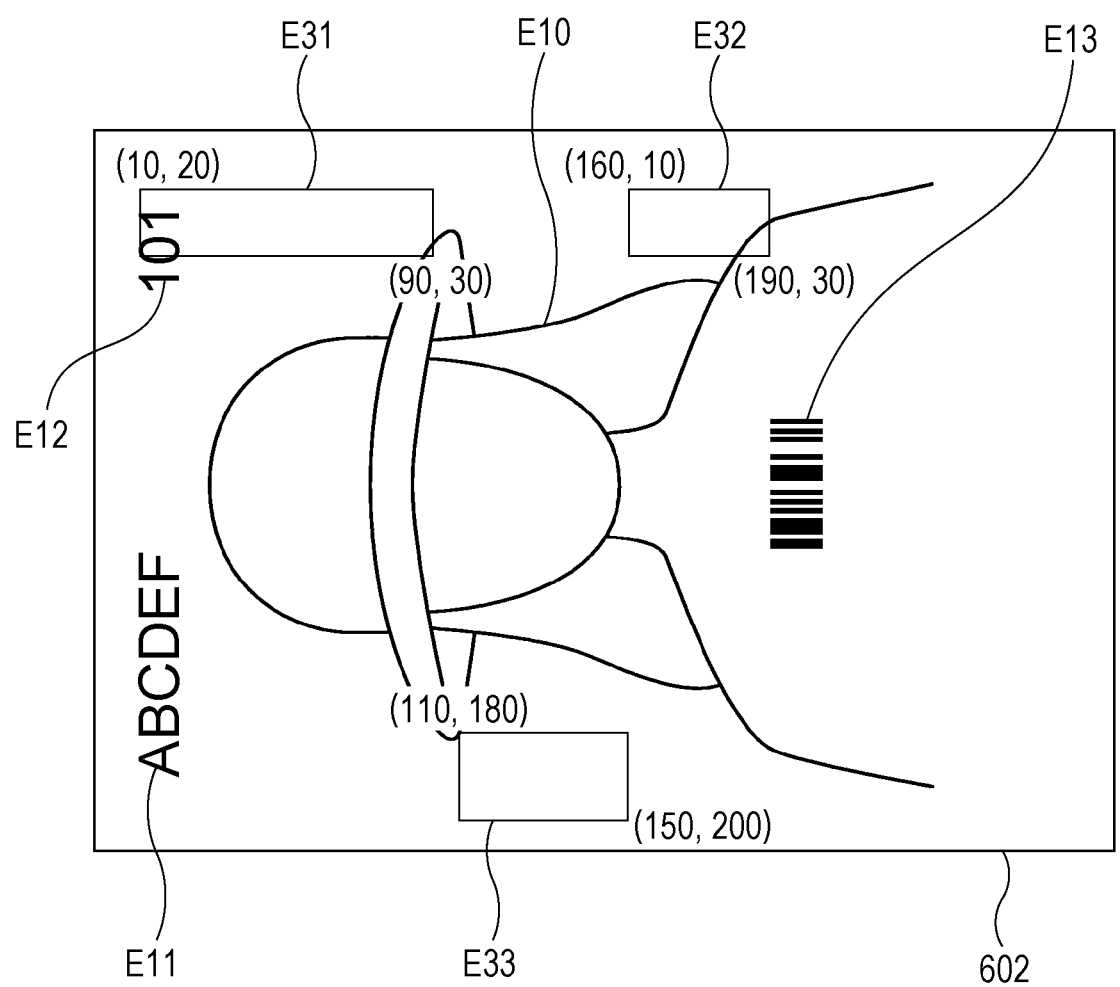
FIG. 18 is a diagram for describing Print Example 3 of a composite image printed on a recording medium in the second inspection operation in the image inspection processing according to the embodiment of the present invention.

FIG. 18 is a diagram illustrating Print Example 3 of a composite image printed on a recording medium in the second inspection operation of the image inspection processing 2 (image inspection system 1) according to the present embodiment.

As is clear from the comparison between Print Example 3 of a composite image illustrated in FIG. 18 and Print Example 1 of a composite image illustrated in FIG. 16, in this example, specific coordinate information is added to each of the designated area images E31, E32, and E33 in Print Example 1 of a composite image illustrated in FIG. 16. Note that in this example, in FIG. 18, with the vertex of the upper left corner of the recording medium 600 (printing paper) as the origin and with this as the reference point, the coordinates of the vertex of the upper left corner and the coordinates of the vertex of the lower right corner of the rectangular frame image of each designated area are printed on the composite image. For example, in the example illustrated in FIG. 18, "(10, 20)" is printed as the coordinates of the vertex of the upper left corner of the image E31 and "(90, 30)" is printed as the coordinates of the vertex of the lower right corner of the image E31 for the designated area image E31.

Hence, when the user sees the print result of the composite image as illustrated in FIG. 18, the user can easily confirm that the designated area images E31, E32, and E33 are not in the desired positions (areas E11, E12, and E13) and are set in wrong positions with respect to the original image. In this example, too, when changing (correcting) data regarding the coordinates of each designated area, the user resets various data regarding the coordinates of the designated area on the external PC 50 or the application installed in the image inspection apparatus 2, so that the designated area images E31, E32, and E33 are arranged in the desired positions (areas E11, E12, and E13). Note that as in this example, in a case where the coordinates of each designated area are printed together with the designated area image, the position of the origin serving as the reference position, the rough correction amount of the data regarding the coordinates of each designated area, and the like can be recognized, and thus the designated area can be changed more easily.

Note that, in the description in this example, the coordinate information of each designated area is printed together with the designated area image when a composite image is printed on a recording medium in the second inspection operation of the image inspection processing 2 (image inspection system 1) according to the present embodiment. However, the present invention is not limited to this example. For example, in the first inspection operation of the image inspection processing 2 according to the present embodiment, the coordinate information of each designated area may be displayed together with the designated area image when the composite image of the read image and the designated area image is displayed on the display operation screen of the operation display 14.

[Effect]

As described above, in the second inspection operation (checking operation) of a designated area for an original image performed at the time of execution of proof mode printing (trial printing) in the image inspection apparatus 2 (image inspection system 1) of the present embodiment, the designated area to be inspected and/or excluded from inspection is set for the original image by the external PC 50 and/or the application installed in the image inspection apparatus 2. Hence, the need to set a designated area for a read image of proof mode printing is eliminated, so that complication of setting of the designated area can be prevented. Since the designated area can be designated with the application at the time of generating the original image, operations to be performed on various images to be printed can be concentrated in one place.

In the second inspection operation (checking operation) of a designated area described above, a composite image of the original image and the designated area image set in the external application is printed on the recording medium and output. Then, by viewing the print result, the user can easily confirm whether the designated area is arranged in a desired position. In the second inspection operation (checking operation) of a designated area described above, if the user sees the print result of the composite image and determines that the designated area is not arranged in a desired position, it is possible to change (correct) various data regarding the coordinates of the designated area so that the designated area is arranged in a desired position by an external PC 50 or an application installed in the image inspection apparatus 2. Further, in the second inspection operation (checking operation) of a designated area described above, if the user sees the print result of the composite image and determines that the designated area is arranged in a desired position, final printing can be executed immediately, and deterioration in productivity can be curbed.

That is, in the image inspection apparatus 2 (image inspection system 1) of the present embodiment, by performing the second inspection operation (checking operation) of a designated area described above at the time of executing proof mode printing (trial printing), the designated area can be easily set, checked, and changed (corrected), and deterioration in productivity can be curbed as well.

Modifications

While configurations of the image inspection system 1 and the image inspection apparatus 2 and the method of the image inspection processing (confirmation and change processing of designated area) according to an embodiment of the present invention have been described above, present invention is not limited to the above, and various other modifications can be made without departing from the gist of the present invention described in the claims.

In the description of the configuration of the above embodiment, when proof mode printing is designated, in the first inspection operation by the image inspection apparatus 2, the composite image of the designated area image and the read image of proof mode printing is displayed on the operation display 14, the user confirms the display result, and the data regarding the coordinates of the designated area is changed if necessary. However, the present invention is not limited to this example. For example, when proof mode printing is designated, a composite image of the designated area image and the read image of proof mode printing may be printed (formed) on a recording medium, the user may check the print result, and the arrangement position of the designated area may be changed if necessary.

In the description of the configuration of the above embodiment, when proof mode printing is designated, in the second inspection operation by the image inspection apparatus 2, a composite image of the designated area image and the original image is printed (formed) on a recording medium, the user checks the print result, and the data regarding the coordinates of the designated area is changed if necessary. However, the present invention is not limited to this example. For example, the image inspection apparatus 2 may display the composite image of the designated area image and the original image on the operation display 14, the user may check the display result, and the arrangement position of the designated area may be changed if necessary.

In the description of the configuration example of the above embodiment, in the second inspection operation by the image inspection apparatus 2, a composite image of the designated area image and the original image is printed (formed) on a recording medium and the user checks the print result. However, the present invention is not limited to this example. For example, depending on the content of the original image or the content of the information to be printed in the designated area, if it is easy to recognize whether the position of the designated area is correct or incorrect without printing the original image, the designated area image alone may be printed on the recording medium in the second inspection operation.

Note that, in the description of the configuration of the above embodiment, the image inspection apparatus 2 includes the printer 10, the image reader 20, and the post processor 30. However, the present invention is not limited to this example. For example, the image inspection apparatus may be only a group of components related to the operation of the above-described correctness confirmation function (image inspection function) of the designated area (inspection target area and inspection exclusion area) for the original image. In this case, the image inspection apparatus may be included in an apparatus including the printer 10, the image reader 20, and the post processor 30, or may be provided as an apparatus separate from these apparatuses.

Although embodiments of the present invention have been described and illustrated in detail, the disclosed embodiments are made for purposes of illustration and example only and not limitation. The scope of the present invention should be interpreted by terms of the appended claims

What is claimed is:

1. An image inspection apparatus comprising
a designated area acquisition device that acquires information related to an area designated in a recording medium, wherein
when trial printing is instructed, a read image of an image printed on the recording medium in the trial printing and an image of the area generated on the basis of the information related to the area acquired by the designated area acquisition device are combined.

2. The image inspection apparatus according to claim 1 further comprising
a display that displays a composite image of the read image and the image of the area.

3. The image inspection apparatus according to claim 2 further comprising
an area image selector capable of selecting the image of the area in the composite image displayed on the display, wherein
the display displays information regarding coordinates of the area corresponding to the image of the area selected by the area image selector.

4. The image inspection apparatus according to claim 3 further comprising
an area information changer capable of changing information regarding coordinates of the area corresponding to the image of the area displayed on the display, wherein
when the information regarding the coordinates of the area is changed by the area information changer, the display displays a composite image of the image of the area corresponding to the changed information regarding the coordinates of the area and the read image.

5. The image inspection apparatus according to claim 4, wherein
the display is capable of displaying a top position of an image of an original that can be printed on the recording medium in final printing,
the area information changer includes a top position changer capable of changing the top position displayed on the display, and
the area information changer changes the information regarding the coordinates of the area on the basis of the top position of the read image designated by the top position changer.

6. The image inspection apparatus according to claim 4, wherein
the display is capable of displaying a reference position of the image of the area,
the area information changer includes a reference position changer capable of changing a reference position of the image of the area displayed on the display to a reference position of the read image, and
the area information changer changes the information regarding the coordinates of the area on the basis of the reference position changed by the reference position changer.

7. The image inspection apparatus according to claim 4 further comprising
a storage that stores the changed information regarding the coordinates of the area.

8. The image inspection apparatus according to claim 1, wherein
the image of the area is an image in which a range of the area is visually recognizable.

9. An image inspection apparatus comprising
a designated area acquisition device that acquires information related to an area designated in a recording medium, wherein
when trial printing is instructed, an image of the area generated on the basis of the information related to the area acquired by the designated area acquisition device is printed on the recording medium.

10. The image inspection apparatus according to claim 9, wherein
when trial printing is instructed, a composite image of an image of an original that can be printed on the recording medium in final printing and the image of the area is printed on the recording medium.

11. The image inspection apparatus according to claim 9, wherein
when trial printing is instructed, coordinate information of the area is printed, together with the image of the area, on the recording medium.

12. The image inspection apparatus according to claim 9, wherein
the image of the area is an image in which a range of the area is visually recognizable.

13. An image inspection system comprising:
an image inspection apparatus that includes a designated area acquisition device that acquires information related to an area designated in a recording medium, and, when trial printing is instructed, combines a read image of an image printed on the recording medium in the trial printing and an image of the area generated on the basis of the information related to the area acquired by the designated area acquisition device; and
an image reader that reads an image printed on the recording medium in the trial printing when the trial printing is instructed.

14. An image inspection method comprising
acquiring information related to an area designated in a recording medium, and
when trial printing is instructed, combining a read image of an image printed on the recording medium in the trial printing and an image of the area generated on the basis of the acquired information related to the area.

15. A non-transitory recording medium storing a computer readable image inspection program causing an information processing apparatus to perform:
acquiring information related to an area designated in a recording medium; and
when trial printing is instructed, combining a read image of an image printed on the recording medium in the trial printing and an image of the area generated on the basis of the acquired information related to the area.

* * * * *